(12) United States Patent
Naderzad et al.

(10) Patent No.: US 12,276,373 B1
(45) Date of Patent: Apr. 15, 2025

(54) APPARATUS TO SECURE ONE OR MORE ELECTRONIC DEVICES TO A DISPLAY TABLE

(71) Applicant: OnQ Solutions, Inc., Hayward, CA (US)

(72) Inventors: Sean A. Naderzad, San Jose, CA (US); Steven D. Penny, Oakland, CA (US)

(73) Assignee: OnQ Solutions, Inc., Hayward, CA (US)

( * ) Notice: Subject to any disclaimer, the term of this patent is extended or adjusted under 35 U.S.C. 154(b) by 23 days.

(21) Appl. No.: 18/530,040

(22) Filed: Dec. 5, 2023

Related U.S. Application Data

(60) Provisional application No. 63/591,764, filed on Oct. 20, 2023.

(51) Int. Cl.
*F16M 13/02* (2006.01)
*E05B 15/00* (2006.01)
*E05B 73/00* (2006.01)

(52) U.S. Cl.
CPC ......... *F16M 13/02* (2013.01); *E05B 15/0046* (2013.01); *E05B 73/0017* (2013.01); *F16M 2200/027* (2013.01)

(58) Field of Classification Search
CPC .............. F16M 13/02; F16M 2200/027; E05B 73/0017; E05B 15/0046; A47F 5/16
USPC ...................................................... 248/205.1
See application file for complete search history.

(56) References Cited

U.S. PATENT DOCUMENTS

| | | |
|---|---|---|
| 5,673,628 A | 10/1997 | Boos |
| 6,220,556 B1 | 4/2001 | Sohrt et al. |
| 6,386,413 B1 | 5/2002 | Twyford |
| 6,700,488 B1 | 3/2004 | Leyden et al. |
| 7,187,283 B2 | 3/2007 | Leyden et al. |
| 7,967,269 B2 | 6/2011 | Liu |
| 8,061,164 B2 | 11/2011 | Johnston et al. |
| 8,191,851 B2 | 6/2012 | Crown |
| 8,240,628 B2 | 8/2012 | Huang |

(Continued)

FOREIGN PATENT DOCUMENTS

WO  WO2019/213490 A1  11/2019

OTHER PUBLICATIONS

Gripzo, "iPad Enclosure", https://www.gripzo.com/en/products/tablets/ipad-enclosure, downloaded on Jun. 11, 2018.

(Continued)

*Primary Examiner* — Todd M Epps
(74) *Attorney, Agent, or Firm* — Pearl Cohen Zedek Latzer Baratz LLP

(57) ABSTRACT

An apparatus for physically securing a tablet and a keyboard includes a main body, a left arm, a right arm a front arm and a top arm. The front arm extends from the main body to secure the front of the keyboard and has a first latching ratchet mechanism that prevents extension of the front arm in a first configuration of the first latching ratchet mechanism and enables extension of the front arm in a second configuration of the first latching ratchet mechanism. The top arm has a second latching ratchet mechanism that prevents extension of the top arm in a first configuration of the second latching ratchet mechanism and enables extension of the top arm in a second configuration of the second latching ratchet mechanism.

20 Claims, 25 Drawing Sheets

(56) References Cited

U.S. PATENT DOCUMENTS

| | | | |
|---|---|---|---|
| 8,360,373 B2 | 1/2013 | Johnson et al. | |
| 8,701,452 B2 | 4/2014 | Foster et al. | |
| 8,814,128 B2 | 8/2014 | Trinh et al. | |
| 8,833,716 B2 * | 9/2014 | Funk | F16M 13/022 |
| | | | 248/316.4 |
| 8,864,089 B2 | 10/2014 | Hung | |
| 8,925,886 B2 | 1/2015 | Sears | |
| 8,985,544 B1 | 3/2015 | Gulick, Jr. | |
| 8,998,048 B1 | 4/2015 | Wu | |
| 9,022,337 B2 * | 5/2015 | Petruskavich | A47F 7/0042 |
| | | | 248/176.1 |
| 9,039,785 B2 | 5/2015 | Gulick, Jr. | |
| 9,097,380 B2 * | 8/2015 | Wheeler | E05B 73/0017 |
| 9,117,351 B2 | 8/2015 | Gulick, Jr. et al. | |
| 9,159,309 B2 | 10/2015 | Liu et al. | |
| 9,161,466 B2 | 10/2015 | Huang | |
| 9,568,141 B1 * | 2/2017 | Zaloom | F16M 13/00 |
| 9,714,528 B2 * | 7/2017 | Van Balen | B60R 11/0252 |
| 9,797,543 B2 * | 10/2017 | Lin | F16M 13/00 |
| 9,936,823 B2 | 4/2018 | Galant | |
| 9,955,598 B1 | 4/2018 | Wen et al. | |
| 10,165,873 B2 * | 1/2019 | Gulick, Jr. | A47F 7/0246 |
| 10,323,440 B1 | 6/2019 | Kelsch et al. | |
| 10,378,248 B1 | 8/2019 | Kelsch et al. | |
| 10,448,759 B1 * | 10/2019 | Chapuis | F16B 2/10 |
| 10,858,865 B2 | 12/2020 | Kelsch et al. | |
| 10,925,414 B2 | 2/2021 | Gulick, Jr. | |
| 11,007,922 B1 * | 5/2021 | Couch | B60P 7/10 |
| 11,045,019 B2 | 6/2021 | Chapuis et al. | |
| 11,122,917 B2 * | 9/2021 | Chapuis | F16M 11/041 |
| 11,363,895 B2 | 6/2022 | Schuft et al. | |
| 11,412,865 B2 | 8/2022 | Chapuis et al. | |
| 11,432,663 B2 * | 9/2022 | Chapuis | A47F 7/00 |
| 11,680,428 B2 * | 6/2023 | Chapuis | F16M 11/22 |
| | | | 248/551 |
| 11,879,275 B2 * | 1/2024 | Penny | A47F 5/16 |
| 2007/0034753 A1 | 2/2007 | Lee | |
| 2010/0108828 A1 | 5/2010 | Yu et al. | |
| 2010/0148030 A1 | 6/2010 | Lin | |
| 2011/0133050 A1 | 6/2011 | Eisenberger, Sr. | |
| 2012/0037783 A1 | 2/2012 | Alexander et al. | |
| 2012/0234055 A1 | 9/2012 | Bland, III et al. | |
| 2013/0301216 A1 | 11/2013 | Trinh et al. | |
| 2013/0318639 A1 | 11/2013 | Gulick, Jr. | |
| 2014/0060218 A1 | 3/2014 | Bisesti et al. | |
| 2014/0263931 A1 | 9/2014 | Chen | |
| 2015/0060624 A1 | 3/2015 | Huang | |
| 2015/0089675 A1 | 3/2015 | Gulick, Jr. | |
| 2015/0108948 A1 | 4/2015 | Gulick, Jr. et al. | |
| 2015/0196140 A1 | 7/2015 | Lin | |
| 2015/0300050 A1 | 10/2015 | Van Balen | |
| 2017/0049251 A1 | 2/2017 | Gulick, Jr. et al. | |
| 2017/0188724 A1 | 7/2017 | Lin | |
| 2018/0058107 A1 | 3/2018 | Lucas et al. | |
| 2018/0279805 A1 | 10/2018 | Galant | |
| 2018/0279809 A1 | 10/2018 | Regan et al. | |
| 2019/0316386 A1 | 10/2019 | Gulick, Jr. et al. | |
| 2020/0008589 A1 | 1/2020 | Chapuis et al. | |
| 2020/0107653 A1 | 4/2020 | Leyden et al. | |
| 2020/0271266 A1 | 8/2020 | Gulick, Jr. et al. | |
| 2021/0015274 A1 | 1/2021 | Chapuis et al. | |
| 2021/0018137 A1 | 1/2021 | Chapuis et al. | |
| 2021/0059437 A1 | 3/2021 | Chapuis et al. | |
| 2021/0164603 A1 | 6/2021 | Chapuis et al. | |
| 2021/0228000 A1 | 7/2021 | Schuft et al. | |
| 2021/0307543 A1 | 10/2021 | Chapuis et al. | |
| 2021/0355714 A1 | 11/2021 | Chapuis et al. | |
| 2022/0412129 A1 | 12/2022 | Chapuis et al. | |

OTHER PUBLICATIONS

Gripzo, "iPhone", https://www.gripzo.com/en/products/smartphones/iphone, downloaded on Jun. 11, 2018.

Scorpion Security Products, "4-Point ERS Phone Scorpion", https://www.scorpionsecurityproducts.com/product/4-point-ers-phone-scorpion/, downloaded on Jun. 11, 2018.

Scorpion Security Products, "4-Point ERS Small Tablet Scorpion", https://www.scorpionsecurityproducts.com/product/4-point-ers-small-tablet-scorpion/, downloaded on Jun. 11, 2018.

Dongguan Comer Electronic Technology Co., Ltd., "Comer Anti-Theft Locking Laptop Mechanical Security Display Frame For Mobile Phone Stores", http://www.comerdisplay.com/sale-8024631-comer-anti-theft-locking-laptop-mechanical-security-display-frame-for-mobile-phone-stores.html, downloaded on Jun. 11, 2018.

Dongguan Comer Electronic Technology Co., Ltd., "Comer Universal Display Mechanical Anti-Theft Security Display Locking System For Tablet Brackets", http://www.smartcomer.com/sale-8028445-comer-universal-display-mechanical-anti-theft-security-display-locking-system-for-tablet-brackets.html, downloaded on Jun. 11, 2018.

RTF, "Vise—Securely And Attractively Placing Your Product First", http://www.rtfglobal.com/products/vise-cell-phone-security/, downloaded on Jun. 11, 2018.

RTF, "Smartphones—Samsung Note 3, LG Flex, HTC One, Apple iPhone 5, Blackberry Z10", http://www.rtfglobal.com/solutions/by-devices-type/smartphones/#!prettyPhoto, downloaded on Jun. 11, 2018.

Gripzo, "Universal Smartphone Grip/ Universal Tablet Grip", https://www.gripzo.com/en/products/smartphones/iphone, downloaded on Jun. 14, 2018.

* cited by examiner

APPARATUS TO SECURE ONE OR MORE ELECTRONIC DEVICES TO A DISPLAY TABLE

CROSS-REFERENCE TO RELATED APPLICATIONS

The present application claims the benefit of U.S. Provisional Patent Application No. 63/591,764, filed on Oct. 20, 2023, which is incorporated by reference herein for all purposes.

FIELD OF TECHNOLOGY

Embodiments of the present technology relate to apparatuses to physically secure electronic devices to tabletops of display tables or to other display surfaces.

BACKGROUND

Portable electronic devices, such as tablets, are often sold in retail stores. Tablets (tablet computers), as the term is used herein, are generally formed as a rectangular body having a display screen (e.g., touch screen) occupying most or all of a primary surface. In some examples, one or more control devices (e.g., buttons) may be provided on the same surface as the touch screen and/or on secondary surfaces (e.g., on side surfaces). In contrast to laptop computers (laptops), tablets may not have built-in keyboards. While a portion of a touchscreen may be configured as a keyboard by suitable software, this may not be an ideal configuration (e.g., because significant screen area is consumed by the keyboard and the keyboard is in the same plane as the display).

To provide additional functionality, a tablet may be used with an external keyboard and/or other peripheral devices. In some cases, an external keyboard and a tablet may be arranged so that the keyboard is substantially horizontal, and the tablet forms an obtuse angle with the tablet (similar to the keyboard and display screen of a laptop). A tablet stand or support may be used to maintain a tablet in a suitable orientation. In some examples, a case or protective cover may be configurable to function as a tablet stand that maintains a tablet at an appropriate angle for viewing while the keyboard is substantially horizontal along the bottom edge of the tablet. Such a case may enclose the tablet (and, in some cases, the keyboard also) for protection when in a closed configuration. A keyboard and/or case may be compatible with one or more tablet and may be sold with a tablet as a package or may be purchased separately. A tablet and keyboard may be displayed together in a retail store so that a potential customer can experience using the tablet with a keyboard.

SUMMARY

Embodiments of the present technology relate to an apparatus for physically securing a tablet and a keyboard to a tabletop of a display table or to another display surface. The apparatus may include a main body with a left slot and a right slot on left and right sides respectively of the main body, a left arm and a right arm that extend respectively through the left slot and the right slot, the left and right arms being extendable and retractable relative to the main body to secure the tablet and the keyboard and a front arm extending from the main body to secure a front of the keyboard, the front arm being coupled to the main body by a first latching ratchet mechanism that prevents extension of the front arm in a first configuration a of the first latching ratchet mechanism and enables extension of the front arm in a second configuration of the first latching ratchet mechanism. The apparatus further includes a back support extending from the main body and a top arm extending from the back support, the top arm is coupled to the back support by a second latching ratchet mechanism that prevents extension of the top arm in a first configuration of the second latching ratchet mechanism and enables extension of the top arm in a second configuration of the first latching ratchet mechanism.

In accordance with certain embodiments, each of the first and second latching ratchet mechanisms include a linear rack with a first plurality of teeth and a pawl with a second plurality of teeth to engage the first plurality of teeth in the first configuration of the first or second latching ratchet mechanism.

In accordance with certain embodiments, each of the first and second latching ratchet mechanisms further include a spring to bias the pawl in the first configuration of the first or second latching ratchet mechanism and a ball plunger to capture the pawl away from the linear rack in the second configuration of the first or second latching ratchet mechanism.

In accordance with certain embodiments, the pawl includes a pawl pin configured to engage a first cam surface to rotate the pawl away from the linear rack into engagement with the ball plunger and to engage a second cam surface to rotate the pawl out of engagement with the ball plunger towards the linear rack.

In accordance with certain embodiments, the first cam surface is at an inner limit of a slot in an arm guide and the second cam surface is at an outer limit of the slot.

In accordance with certain embodiments, the apparatus further includes a left brace of the left arm, the left brace configured to engage a left edge of each of the tablet and the keyboard; and a right brace of the right arm, the right brace configured to engage a right edge of each of the tablet and the keyboard.

In accordance with certain embodiments, the left brace includes a left rotating arm that is rotatable between a first position to engage a lower edge of the tablet and a second position that is clear of the lower edge of the tablet; and the right brace includes a right rotating arm that is rotatable between the first position to engage a lower edge of the tablet and the second position that is clear of the lower edge of the tablet.

In accordance with certain embodiments, the left and right rotating arms are rotatable through at least 90 degrees.

In accordance with certain embodiments, the left arm includes a left linear rack that engages circumferential teeth of a circular gear; the right arm includes a right linear rack that engages the circumferential teeth of the circular gear such that retraction and extension of the left and right arms occurs in tandem; and the circular gear includes radial teeth that extend radially from an axis of rotation of the circular gear to engage corresponding radial teeth of a locking element.

In accordance with certain embodiments, the apparatus further includes one or more spring to maintain the locking element engaged with the radial teeth of the circular gear; and a knob to enable manual movement of the locking element away from the circular gear to unlock the circular gear and thereby enable extension of the left and right arms.

In accordance with certain embodiments, the apparatus further includes one or more ratcheting buttons, each ratcheting button located in a corresponding hole in the back support, each ratcheting button configured to be movable within the corresponding hole toward the tablet with a ratchet mechanism to prevent movement of the ratcheting button away from the tablet within the corresponding hole.

Embodiments of the present technology relate to an apparatus for physically securing a tablet and a keyboard to a tabletop of a display table or to another display surface. The apparatus includes a main body having a top surface, a back support extending from the top surface, the back support including a back support surface that extends along a plane that forms an obtuse angle with the top surface to support the tablet, a top arm extending from the back support to secure a top edge of the tablet, a front arm extending from the main body to secure a front of the keyboard, a left arm and a right arm each of which is extendable and retractable relative to the main body, a left brace and a right brace, attached to the left and right arms respectively, and configured to engage left edges and right edges, respectively, of the keyboard and the tablet. The apparatus further includes a first latching ratchet mechanism that prevents extension of the top arm in a first configuration of the first latching ratchet mechanism and enables extension of the top arm in a second configuration of the first latching ratchet mechanism, a second latching ratchet mechanism that prevents extension of the front arm in a first configuration of the second latching ratchet mechanism and enables extension of the front arm in a second configuration of the second latching ratchet mechanism a locking mechanism configured to lock the left and right arms in place; and a plurality of fasteners that extend downward from a bottom surface of the main body.

In accordance with certain embodiments, the locking mechanism is inaccessible with the tablet lying along the back support surface.

In accordance with certain embodiments, each of the first and second latching ratchet mechanisms include a linear rack with a first plurality of teeth and a pawl with a second plurality of teeth to engage the first plurality of teeth in the first configuration of the first or second latching ratchet mechanism.

In accordance with certain embodiments, the first and second latching ratchet mechanisms are only releasable by retracting respectively the top arm and the front arm to their respective limits of travel.

In accordance with certain embodiments, the left brace and the right brace include rotatable arms, the rotatable arms are rotatable to engage a lower edge of the tablet at a predetermined height above the top surface in a first configuration and to disengage from the lower edge of the tablet in a second configuration.

In accordance with certain embodiments, the apparatus further includes a plurality of fasteners that extend downward from a bottom surface of the main body and are attachable to a tabletop of a display table or to another display surface to thereby secure the main body to the tabletop or other display surface.

In accordance with certain embodiments, the locking mechanism further includes a lock release that extends downward from the bottom surface of the main body to extend below the display table or other display surface when the main body is secured to the tabletop or other display surface.

Embodiments of the present technology relate to an apparatus for physically securing a tablet and a keyboard to a tabletop of a display table or to another display surface. The apparatus includes a main body; a back support extending from the main body, the back support including a back support surface to support the tablet; a top arm extending from the back support to secure a top edge of the tablet; a first latching ratchet mechanism that prevents extension of the top arm in a first configuration of the first latching ratchet mechanism and enables extension of the top arm in a second configuration of the first latching ratchet mechanism; a front arm extending from the main body to secure a front of the keyboard; and a second latching ratchet mechanism that prevents extension of the front arm in a first configuration of the second latching ratchet mechanism and enables extension of the front arm in the second configuration of the second latching ratchet mechanism. The apparatus further includes a left arm and a right arm which are extendable and retractable in tandem relative to the main body; a locking mechanism configured to lock the left and right arms in place, the locking mechanism includes a lock release that is only accessible from below the tabletop; a left brace attached to the left arm, the left brace configured to engage left sides of the keyboard and the tablet, the left brace includes a left rotating arm that is rotatable between a first position to engage a lower edge of the tablet and a second position that is clear of the lower edge of the tablet; a right brace attached to the right arm, the right brace configured to engage right sides of the keyboard and the tablet, the right brace includes a right rotating arm that is rotatable between the first position to engage the lower edge of the tablet and the second position that is clear of the lower edge of the tablet; and a plurality of fasteners that extend downward from a bottom surface of the main body and are attachable to the tabletop to thereby secure the main body to the tabletop or other display surface.

In accordance with certain embodiments, each of the first and second latching ratchet mechanisms include: a linear rack with a first plurality of teeth and a pawl with a second plurality of teeth to engage the first plurality of teeth in the first configuration of the first or second latching ratchet mechanism; a spring to bias the pawl in the first configuration of the first or second latching ratchet mechanism and a ball plunger to capture the pawl away from the linear rack in the second configuration of the first or second latching ratchet mechanism; and a pawl pin extending from the pawl, the pawl pin configured to engage a first cam surface to rotate the pawl away from the linear rack into engagement with the ball plunger and to engage a second cam surface to rotate the pawl out of engagement with the ball plunger towards the linear rack This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present technology generally relate to apparatuses that can be used to physically secure tablets and keyboards to tabletops of display tables or to other display surfaces. The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Figure 1A:
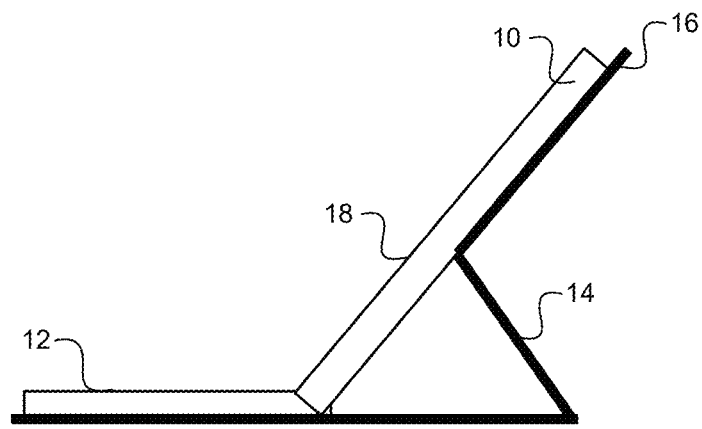
FIGS. 1A-C show examples of tablets and keyboards in different configurations.

FIG. 1A shows an example of a tablet 10 and keyboard 12 with a tablet stand 14 formed by a portion of a case 16 in side view. In this example, the case 16 is deployed as a tablet stand by folding it as shown so that it maintains tablet 10 at an appropriate angle for viewing (this angle may be fixed or may be adjustable by a user in some designs). When not deployed as a tablet stand, case 16 may fold about tablet 10 to cover touchscreen 18 of tablet 10. Case 16 may be attached to keyboard 12 to maintain keyboard 12 in the location shown (along the bottom edge of tablet 10) when deployed and to enclose keyboard 12 with tablet 10 when not deployed. Other tablet stands may not fold in this manner. The present technology is not limited to tablets and keyboards used with a stand (e.g., tablet and keyboard may be used without a separate stand) or to any type(s) of stand (e.g., a tablet stand may be formed from a case or otherwise). Tablet 10 and keyboard 12 may be communicatively coupled by an appropriate coupling, which may be a wired coupling (e.g., USB) or wireless (e.g., Bluetooth). Where a wired coupling is used, wires may pass through a case or stand or wires may be separate (e.g., dedicated cable).

Figure 1B:
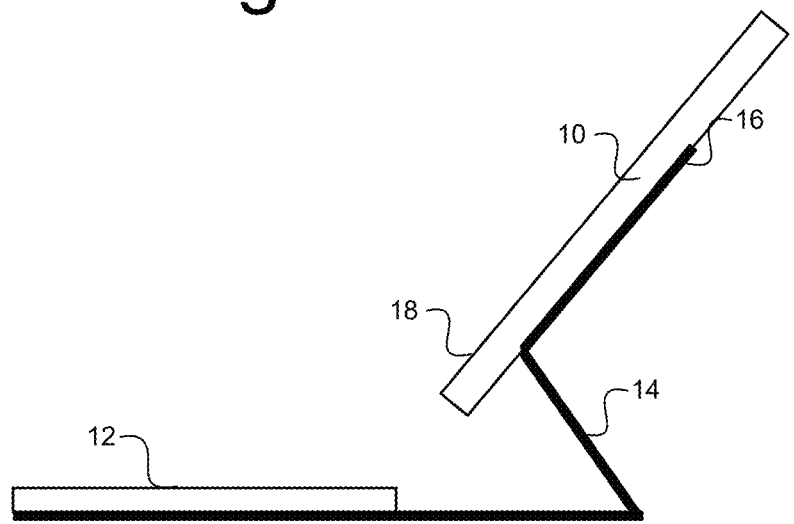

FIG. 1B shows another example of a tablet 10 and keyboard 12 with a tablet stand 14 formed by a portion of a case 16 in side view. In this example, the case 16 is formed of a rigid material that includes stiff hinges to maintain tablet 10 at an appropriate height and angle for viewing (this angle may be fixed or may be adjustable by a user in some designs). When not deployed as a tablet stand, case 16 may fold about tablet 10 to cover touchscreen 18 of tablet 10. Elevating the tablet from a support surface (e.g., top of desk or table) in this manner may provide a better viewing angle compared with FIG. 1A.

Figure 1C:
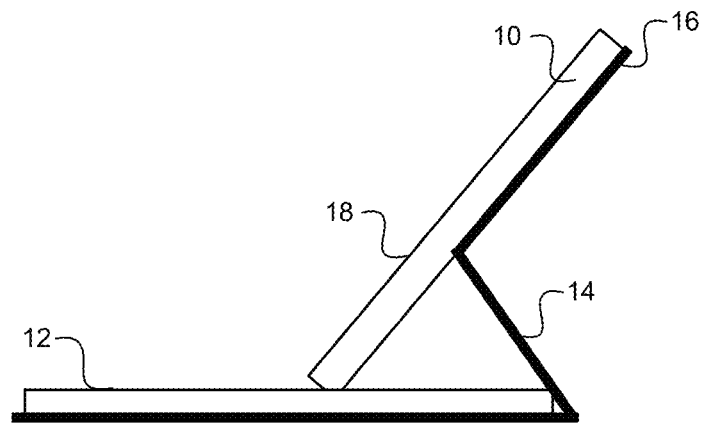

FIG. 1C shows another example of a tablet 10 and keyboard 12 with a tablet stand 14 formed by a portion of a case 16 in side view. In this example, a bottom edge of tablet 10 intersects a middle area of the top surface 19 of keyboard 12. This arrangement may facilitate a larger keyboard 12 than previous examples. When not deployed as a tablet stand, case 16 may fold about tablet 10 to cover touchscreen 18 of tablet 10.

In order to provide a potential buyer with a realistic user experience in a retail store, a tablet and a keyboard may be displayed together in a configuration similar to that shown in any of FIGS. 1A-C (e.g., with a tablet stand in a deployed configuration holding a tablet and a keyboard ready for use or without any stand). Such a display provides certain security challenges. For example, an apparatus that may secure a tablet alone may not accommodate a tablet and a keyboard deployed as shown. An apparatus that is designed to secure a laptop may not adequately secure a combination of a tablet and a keyboard that are easily separable and may not accommodate a deployed tablet stand.

Figure 2A:
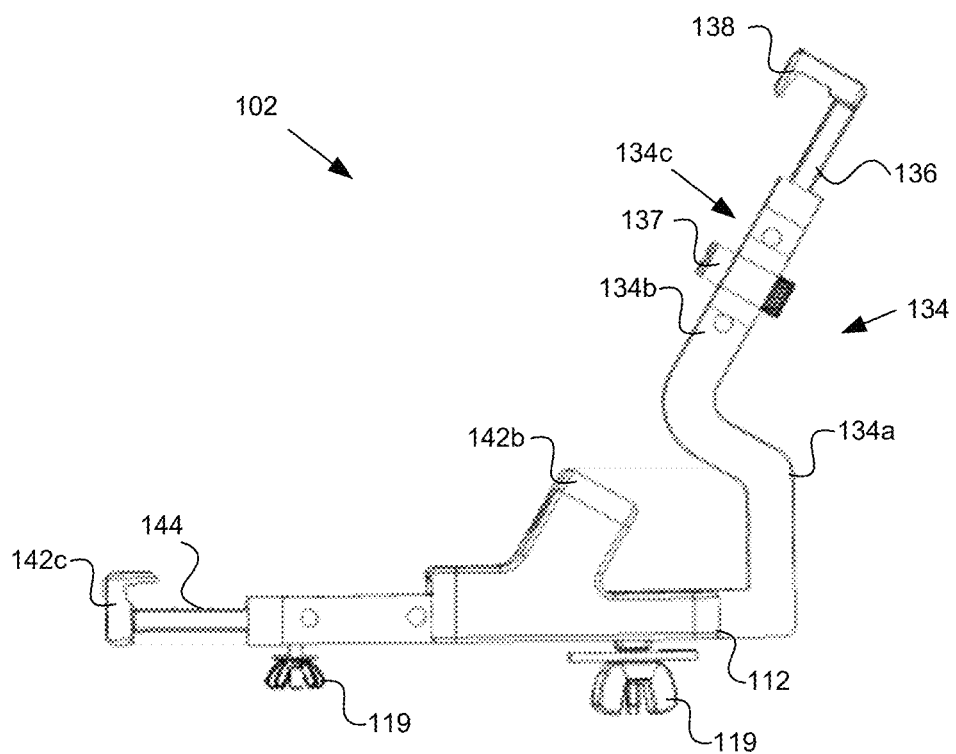
FIGS. 2A-C illustrate an example of an adjustable mount for a tablet and keyboard.
Figure 2B:
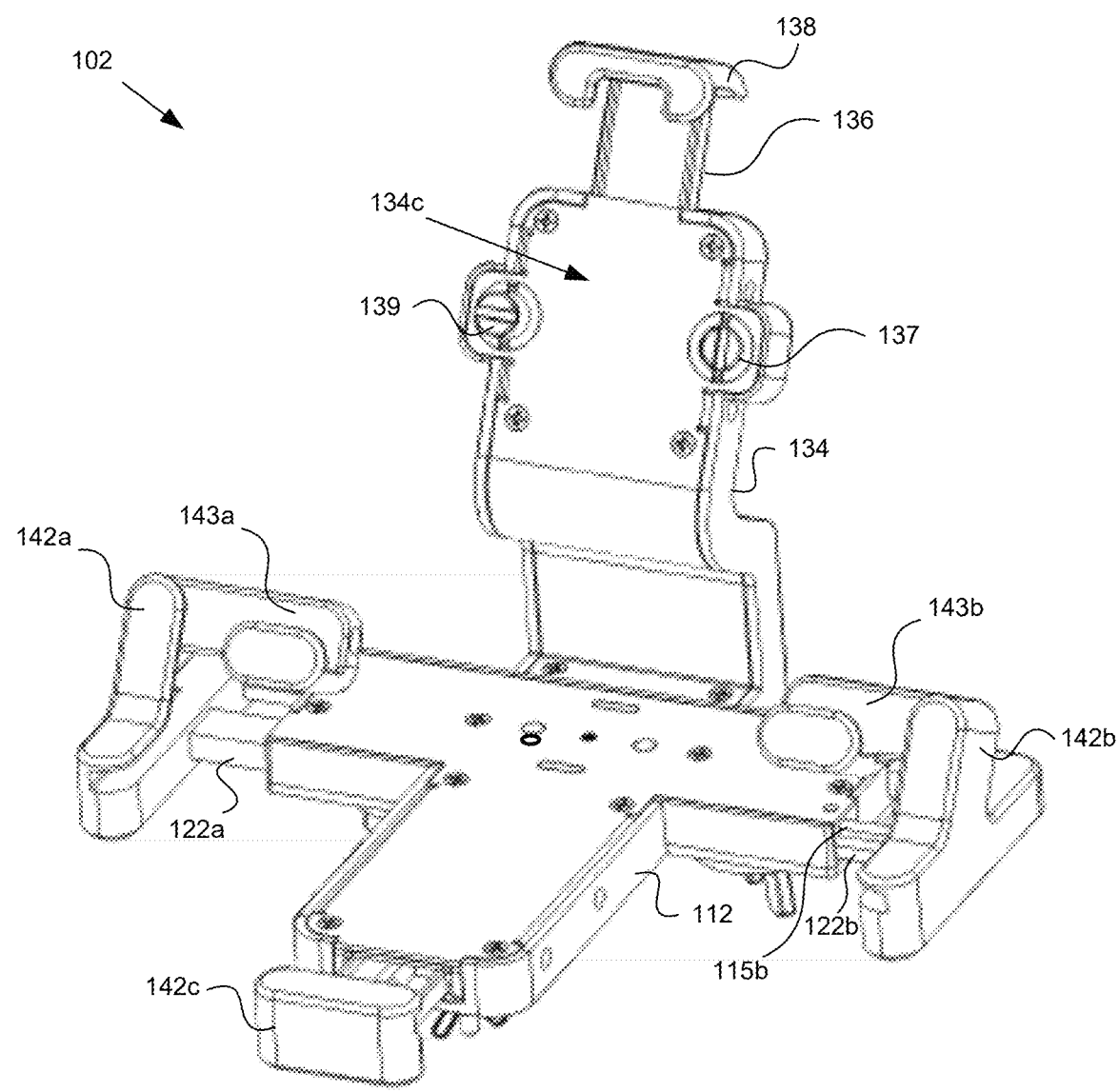
Figure 2C:
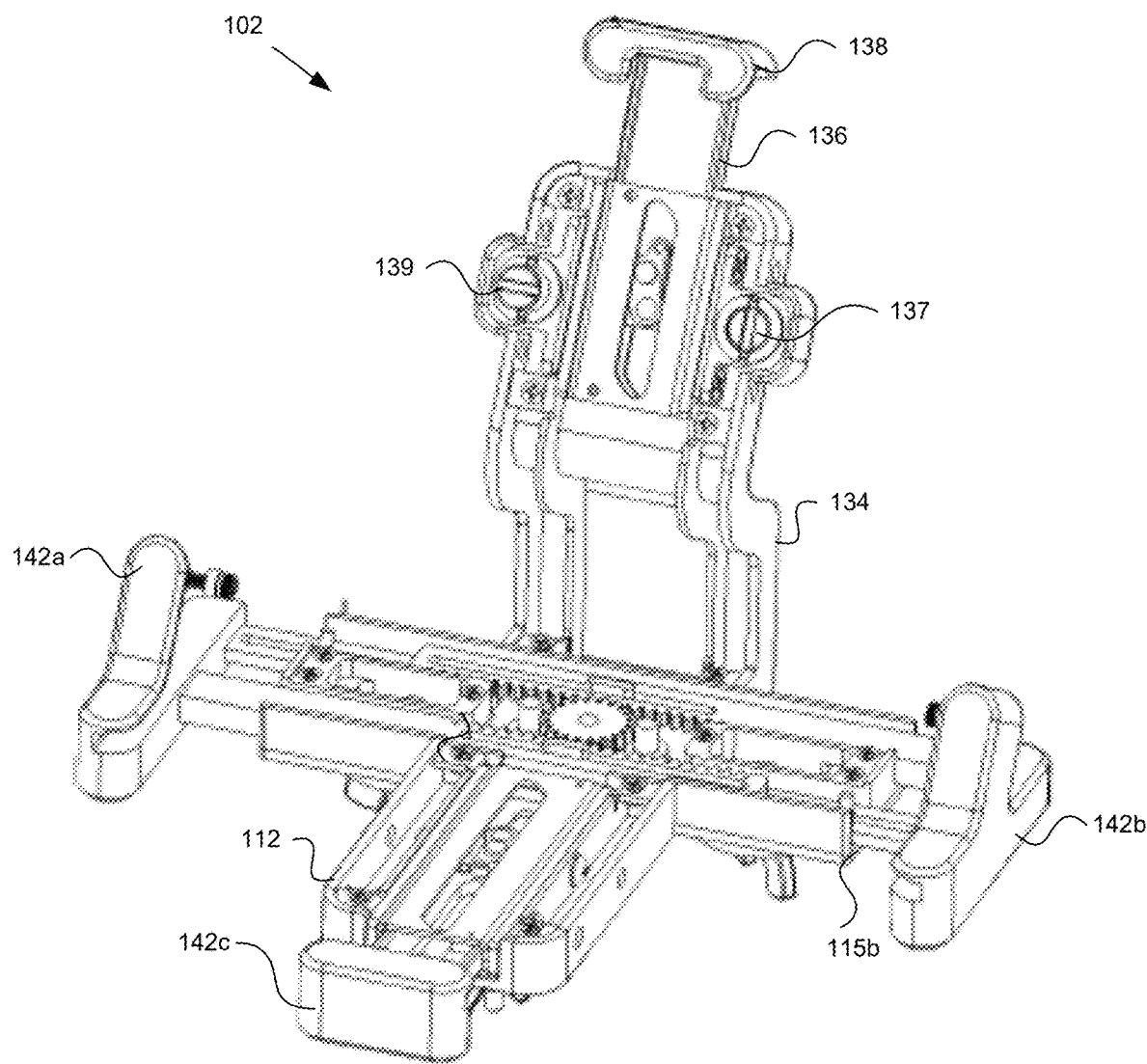

FIG. 2A is a side view of an adjustable tablet security mount 102 (mount), according to an embodiment of the present technology, which can be used to mount a tablet and a keyboard (e.g., with or without a deployed tablet stand) to a tabletop of a display table or to another display surface. The adjustable tablet security mount 102 can also be referred to more succinctly herein as the security mount 102, or even more succinctly as the mount 102. FIG. 2B shows a perspective view of the mount 102 and FIG. 2C shows a view of the mount 102 introduced in FIG. 2A with some cover plates removed to show internal features. As will be appreciated from the following discussion, because of the adjustability of the security mount 102 it can beneficially be used with tablets of various different dimensions and/or keyboards of various different dimensions and/or tablet stands (including stands formed by folding cases) of various different dimensions, including various different widths, depths, and thicknesses.

Referring to FIG. 2A, the mount 102 is shown as including a main body 112, a back support 134, a top arm 136, a top brace 138, a right brace 142b (FIG. 2A shows the right side of mount 102), a front arm 144 and a front brace 142c. Extending downward from the bottom surface of main body 112 are fasteners 119 (e.g., threaded bolts).

Back support 134 extends from a back edge of main body 112 and may be securely attached to main body 112 (e.g., main body 112 and back support 134 may be formed of steel or other suitable metal or alloy and may be welded together for security). Back support 134 includes a lower portion 134a, which extends at a right angle (90 degrees) to main body 112, and an upper portion 134b, which is angled (at an acute angle) with respect to lower portion 134a and forms a back support surface 134c for a tablet (e.g., extends along a plane at an angle that is compatible with a user viewing angle and with angles provided by tablet stands to be displayed). Top arm 136 is attached to upper portion 134b and is configurable to extend to accommodate tablets of different sizes. Top brace 138 is hook-shaped in cross-section from the side as illustrated in FIG. 2A in order to engage a top edge of a tablet. Top arm 136 and top brace 138 may be integrally formed (e.g., from a single piece of metal), welded together, or otherwise joined in a secure manner. A ratcheting button 137 is shown extending through upper portion 134b and protruding past back support surface 134c. Ratcheting buttons (described in more detail below) may be used to hold a tablet or other component more securely (e.g., by reducing or eliminating "wiggle room" between the tablet and the security mount).

FIG. 2B shows a perspective view of mount 102 including main body 112, left brace 142a, right brace 142b, front brace 142c, right arm 122b extending through a right side slot 115b, left arm 122a, back support 134 including back support surface 134c, top arm 136, top brace 138 (to engage the top edge of a tablet) and ratcheting buttons 137 and 139. Also visible in FIG. 2B are a left rotating arm 143a and a right rotating arm 143b, which are configurable (e.g., configured to engage the lower edge of a tablet in FIG. 2B). A left side slot 115a, which cannot be seen in FIG. 2B, is located on the left side of main body 112.

FIG. 2C shows a view of mount 102 with cover plates of main body 112 and back support 134 removed to show certain internal components of mount 102 which enable a tablet and keyboard to be securely attached to the surface of a display table or other surface. Mechanisms are provided to securely engage a tablet and a keyboard while leaving the user experience unaffected (e.g., without obscuring the tablet screen or the keys of the keyboard).

Figure 3A:
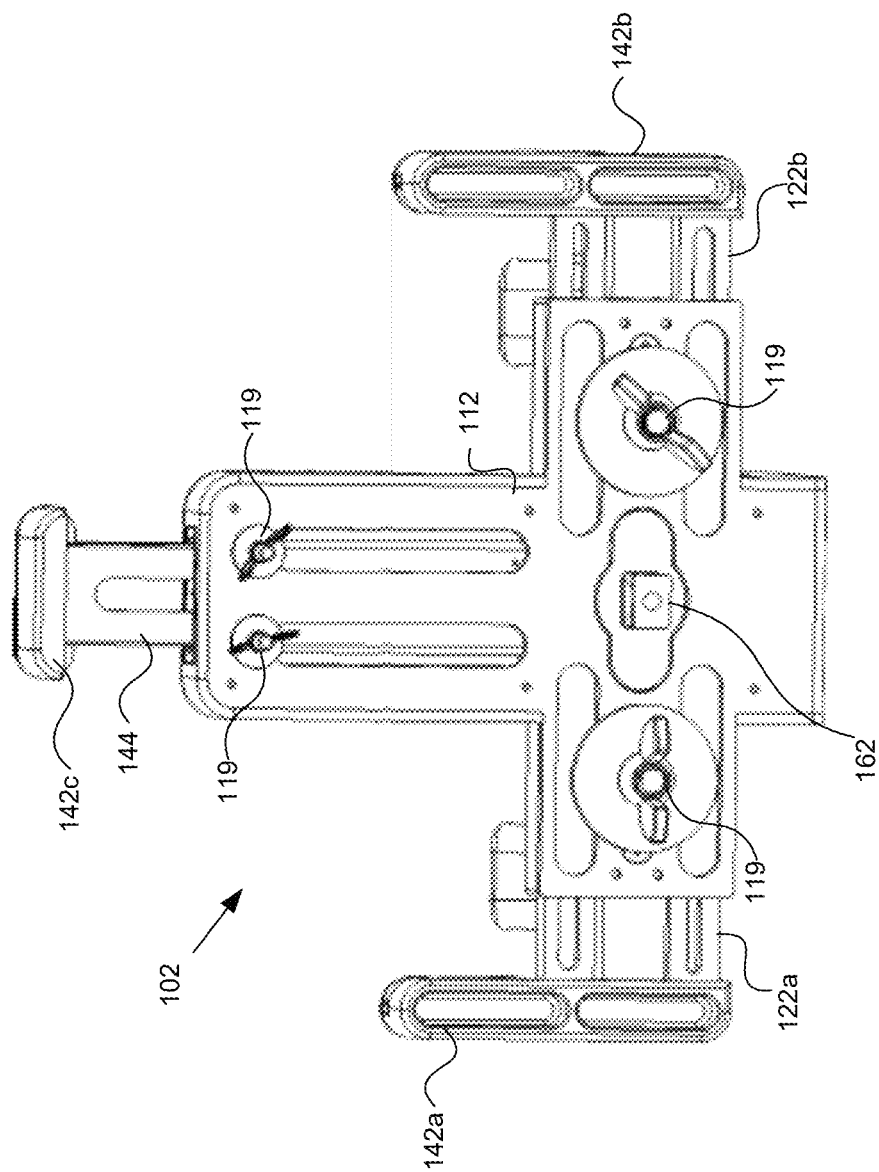
FIGS. 3A-F illustrate examples of arms with a locking mechanism.

FIG. 3A shows left arm 122a, right arm 122b, left brace 142a and right brace 142b, extending outward from main body 112. FIG. 3A shows a view from below with the bottom surface of main body 112 exposed and fasteners 119 visible. Because fasteners 119 are accessed from below, they are inaccessible when mount 102 is attached to a surface (e.g., bolted to surface by fasteners 119). A knob 162 extends from main body 112. Knob 162 may be accessed from below (e.g., below the surface of a display case, which may be inaccessible without a key) when mount 102 is mounted on a surface to allow left arm 122a and right arm 122b to be extended. The left arm 122a and the right arm 122b are extendable and retractable through respective slots 115a and 115b in the main body 112. In accordance with certain embodiments, the left arm 122a and the right arm 122b move in concert with one another, i.e., in tandem. More specifically, in certain embodiments, manually maneuvering one of the left and right arms 122a, 122b will cause the other one of the arms to be maneuvered. For example, maneuvering the left arm 122a further out of the left slot 115a will also cause the right arm 122b to be maneuvered further out of the right slot 115b, and vice versa. Conversely, pushing the left arm 122a further into the left slot 115a will also cause the right arm 122b to be pushed further into the right slot 115b, and vice versa. This will ensure that a component (e.g., tablet and/or keyboard) that is secured to the mount 102 is centered left to right.

The front arm 144 with front brace 142c is also separately movable with respect to main body 112. The maneuverability of the left and right arms 122a, 122b and corresponding left and right braces 142a, 142b enables the mount 102 to be used with tablets and keyboards of various different widths. The maneuverability of front arm 144 and top arm 136 (not visible in FIG. 3A) and corresponding front and top braces 142c, 138 enables the mount 102 to be used with keyboards, tablets and tablet stands of various different heights. The adjustability of ratcheting buttons 137, 139 (and any other buttons if provided) enables the mount 102 to be effectively used with tablets of various depths. The terms maneuverability and adjustability are often used interchangeably herein.

The left brace 142a, the right brace 142b, and the front brace 142c can also be referred to collectively as the braces 142, or individually as a brace 142. In certain embodiments, one or more of the braces 142 are adjustable. In alternative embodiments, the braces 142 are not adjustable and are configured for use with tablets and keyboards having a relatively narrow range of thicknesses.

Figure 3B:
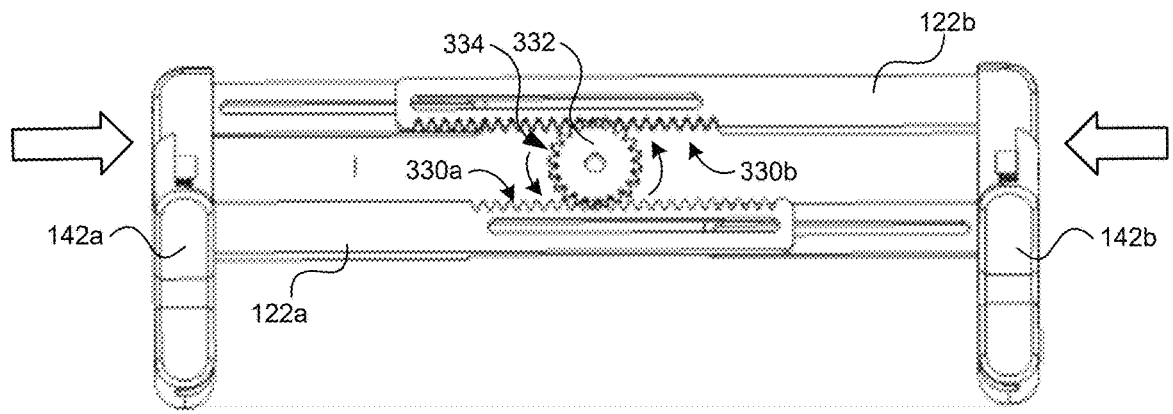
Figure 3C:
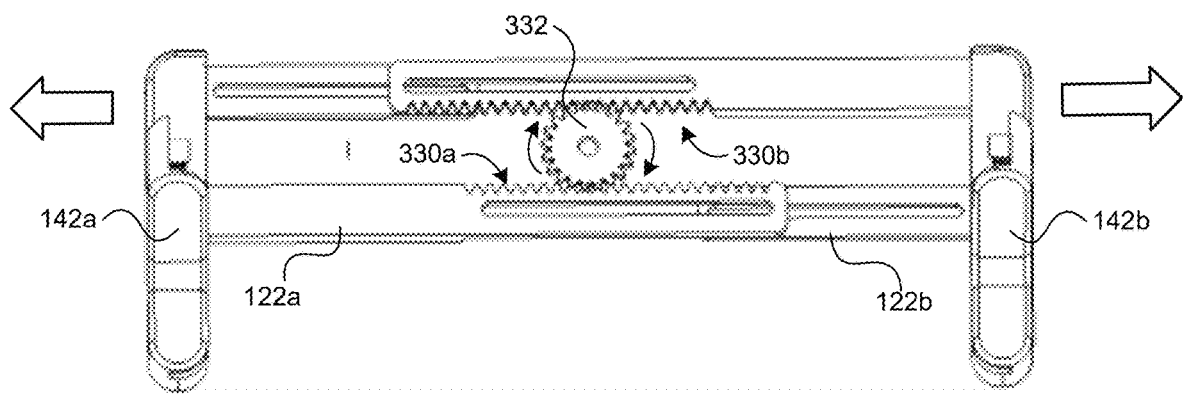

Various mechanical systems may be used to facilitate extension and retraction of left arm 122a and right arm 122b (and with them left brace 142a and right brace 142b). FIGS. 3B-C illustrate an example of a mechanical system for extension and retraction of arms in the extended and retracted configurations respectively, including a locking mechanism to lock arms in a retracted or partially retracted position. FIG. 3B shows a circular gear 332 that includes circumferential teeth 334 around its circumference.

FIGS. 3B and 3C are top views of left arm 122a, right arm 122b, left brace 142a and right brace 142b (other components including main body 112 and back support 134 are omitted for clarity). Left arm 122a and right arm 122b are extendable and retractable (relative to the main body 112) to secure a tablet and a keyboard. The left and right braces 142a, 142b are configured to be secured to the left and right sides of each of a tablet and a keyboard (e.g., features of left and right braces engage the left and right edges of the tablet and keyboard to capture the edges).

Referring to FIGS. 3B and 3C, left arm 122a and right arm 122b are configured to extend and retract in tandem. FIG. 3B shows left arm 122a and right arm 122b retracting inwards in tandem with circular gear 332 rotating counterclockwise. FIG. 3C shows left arm 122a and right arm 122b extending outward in tandem with circular gear 332 rotating clockwise.

Left arm 122a includes a left linear rack 330a (row of teeth) that engages corresponding circumferential teeth 334 of circular gear 332 (circumferential teeth that are formed along the circumference of circular gear 332). Right arm 122b includes a right linear rack 330b (row of teeth) that engages corresponding circumferential teeth 334 of circular gear 332. Engagement of linear racks 330a, 330b and circumferential teeth 334 of circular gear 332 ensures that left and right arms 122a and 122b retract together (as shown in FIG. 3B) and extend together (as shown in FIG. 3C). Engagement of linear racks 330a, 330b with circular gear 332 also enables left and right arms 122a and 122b to be locked in position in tandem (e.g., if any one of the left and right arms 122a, 122b or the circular gear 332 is locked and unable to move, then the other two components are also locked). In an example, circular gear 332 may be locked in order to lock (prevent movement of) left arm 122a and right arm 122b.

Left and right arms 122a, 122b may be constrained to extend and retract along a straight line path. Guides may be provided for this purpose. For example, slots may be provided in left and right arms 122a, 122b and corresponding pins may extend through such slots (and/or on either sides of left and right arms 122a, 122b) to maintain straight line movement. In some cases, one or more springs may be provided (not shown in the present drawings) to provide forces to extend or retract left and right arms 122a, 122b. For example, when circular gear 332 is unlocked to allow left and right arms 122a, 122b to extend, one or more springs may provide a force that extends the arms without further user manipulation.

Figure 3D:
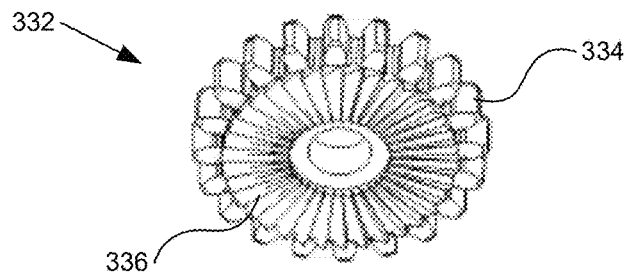

FIG. 3D shows an example of circular gear 332 configured to facilitate locking of left and right arms 122a and 122b. FIG. 3D shows circumferential teeth 334 that extend around the circumference of circular gear 332 to engage corresponding teeth of left and right linear racks 330a, 330b. In addition, FIG. 3D shows radial teeth 336 that extend radially along a surface of circular gear 332 (the lower surface in this example). Radial teeth 336 have a sawtooth shape in cross section in this example (e.g., an asymmetric shape with a vertical face on one side and an inclined face on the other side.) The pattern of radial teeth 336 is configured to engage corresponding radial teeth of a locking element so that circular gear 332 may be prevented from rotating in one direction (e.g., with forces applied between opposed vertical faces) while allowing rotation in the opposite direction (e.g., with forces applied between opposed inclined faces allowing vertical displacement and rotation).

Figure 3E:
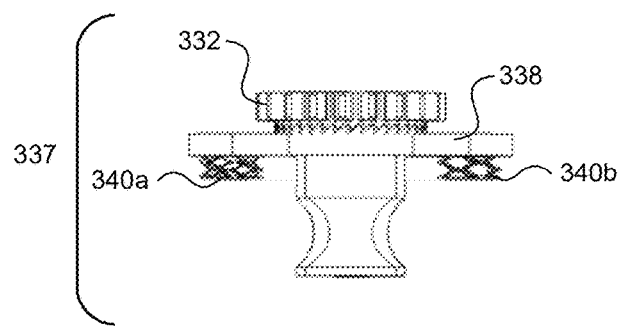

FIG. 3E shows a locking element 338 that has radial teeth that engage corresponding radial teeth 336 of circular gear 332 and thereby prevent rotation of circular gear 332 in one direction. In this example, clockwise rotation of circular gear 332 (e.g., as shown in FIG. 3C) is prevented so that extension of left and right arms 122a, 122b is prevented (e.g., to prevent removal of a tablet and/or keyboard). Counterclockwise rotation of circular gear 332 (e.g., as shown in FIG. 3B) is enabled so that retraction of left and right arms 122a, 122b is enabled (e.g., to facilitate securing a tablet and/or keyboard).

Locking element 338 is supported on springs 340a, 340b, which provide force between opposing radial teeth of locking element 338 and circular gear 332. Springs 340a, 340b may provide an appropriate force to ensure that circular gear 332 may turn in one direction (e.g., counterclockwise) as radial teeth cause vertical displacement of locking element 338 without requiring excessive force. While two springs 340a, 340b are used in this example, one or more springs (e.g., two, three, four, etc.) may be used to maintain radial teeth of locking element 338 engaged with the radial teeth of circular gear 332.

Locking element 338 may be vertically displaced a short distance by the cam action of opposed radial teeth. In addition, locking element 338 may be manually displaced a larger distance to disengage opposed radial teeth of locking element 338 and circular gear 332.

Figure 3F:
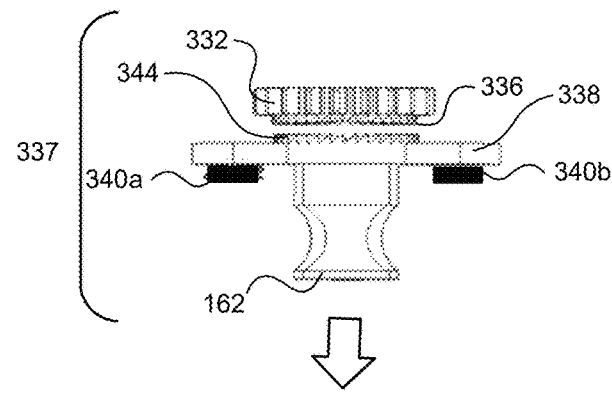

FIG. 3F shows an example of locking element 338 displaced downwards (e.g., along the axis of circular gear 332 in the direction indicated by the arrow) to disengage radial teeth 344 of locking element 338 from corresponding radial teeth 336 of circular gear 332. Force to displace locking element 338 downwards may be provided manually by a user gripping knob 162 (which may extend from the bottom of mount 102 as shown in FIG. 3A). While a knob is shown as being used as a lock release to enable manual movement of the locking element away from the circular gear to unlock the circular gear and thereby enable extension of the left and right arms in this example, in alternative embodiments other features may be used as a lock release (e.g., a lever, button, ring, rotating element or other mechanical feature) in place of the knob.

With locking element 338 in this lowered position (as shown in FIG. 3F), circular gear 332 is free to rotate in either direction, including in a clockwise direction, which allows extension of left and right arms 122a, 122b. Unless a user pulls (or otherwise cause movement of) locking element 338 downwards it remains engaged with circular gear 332 and prevents extension of left and right arms 122a, 122b to prevent removal of a tablet and/or keyboard. For example, once left and right arms 122a, 122b are retracted to a position in which left and right braces 142a, 142b engage left and right edges of a tablet and/or keyboard, removal of the tablet and/or keyboard may only be possible after left and right arms 122a, 122b are extended to disengage left and right braces 142a, 142b from edges of the tablet and/or keyboard. Extending left and right arms for removal of the tablet and/or keyboard requires accessing knob 162 (or an alternative type of lock release), which may be located in a secure location (e.g., inside a locked space such as a cabinet below a display surface).

The range of extension/retraction of left and right arms 122a, 122b may be sufficient to allow tablets and/or keyboards with a wide range of dimensions to be secured so that the present technology is adaptable to secure different products at different times without significant reconfiguration. For example, the maximum extension of left and right arms 122a, 122b may be sufficient to allow insertion of a very wide tablet and/or keyboard, which is subsequently secured by retracting the arms to cause engagement of left and right braces 142a, 142b with edges of the tablet and/or keyboard. And the minimum extension of left and right arms 122a, 122b may be sufficient to enable securing of a very narrow tablet and/or keyboard.

Left brace 142a and right brace 142b may be adaptable to a wide range of tablet and/or keyboard dimensions. According to aspects of the present technology, the left and right braces each include a rotating arm that has two positions to enable at least two configurations one of which supports a tablet at a predetermined height above a tabletop (e.g., as illustrated in FIG. 1B).

Figure 4A:
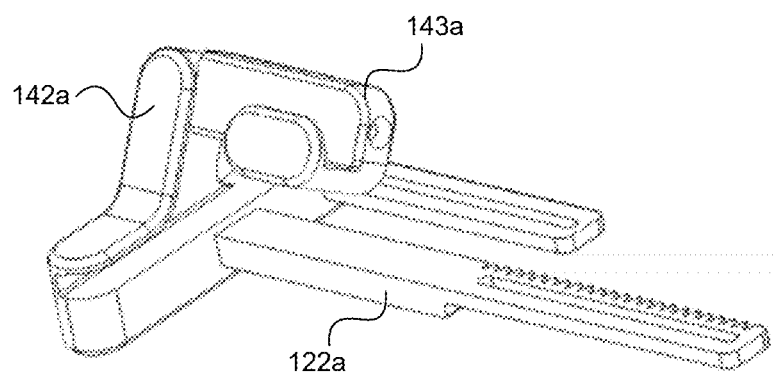
FIGS. 4A-M illustrate examples of arms that are adjustable to secure tablets in different configurations.
Figure 4B:
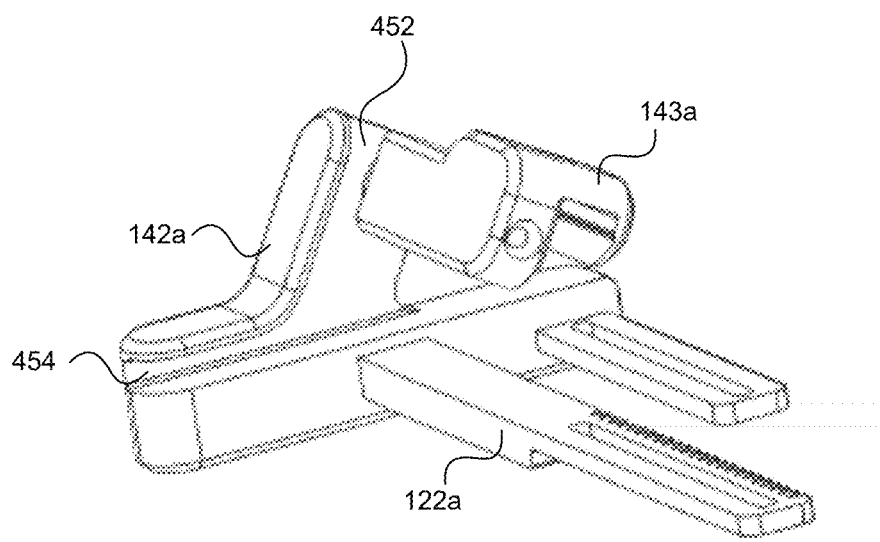

FIGS. 4A-B show an example of left arm 122a in which left brace 142a includes a left rotating arm 143a that is rotatable between a first position to engage a lower edge of a tablet and a second position that is clear of the tablet. A corresponding right brace 142b may also include a right rotating arm 143b that is rotatable between the first position to engage the lower edge of the tablet and the second position that is clear of the tablet (e.g., the right brace 142b may be a mirror image of the left brace 142a shown in FIGS. 4A-B).

FIG. 4A shows left rotating arm 143a in the first position in which hook-like features may engage a lower edge of a tablet to support and secure the tablet (e.g., to secure a tablet in a configuration like the configuration of FIG. 1B in which the lower edge of the tablet is elevated above a support surface).

FIG. 4B shows left rotating arm 143a in the second position in which it is rotated 180 degrees from the first position so that it does not engage the lower edge of the tablet (e.g., hook-like features are rotated away from the tablet to allow the tablet to extend down through a first slot 452 in left brace 142a, for example, as show in the configurations of FIG. 1A or 1C). A second slot 454 in left brace 142a secures the left edge of a keyboard. While left rotating arm 143a rotates through 180 degrees in this example, in other examples the left and right rotating arms may be rotatable through more or less than 180 degrees (e.g., rotatable through 90 degrees, 120 degrees, or other angle).

Figure 4C:
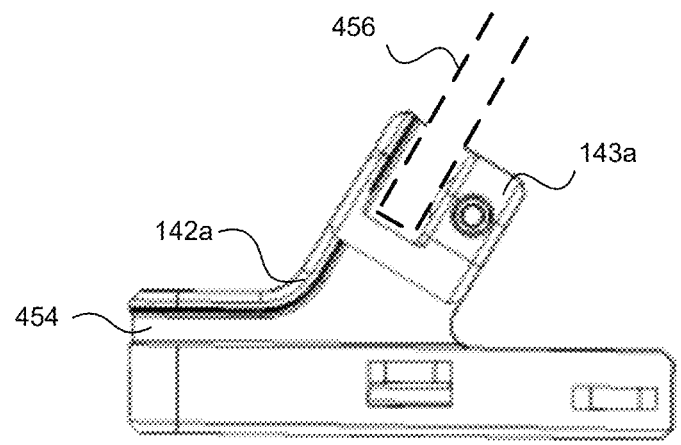

FIG. 4C shows a side view of left brace 142a with left rotating arm 143a in the first position and the lower edge of a tablet 456 shown in outline in first slot 452. It can be seen that the lower edge of tablet 456 is held by left rotating arm 143a which includes hook-like features to engage the lower edge of tablet 456.

Figure 4D:
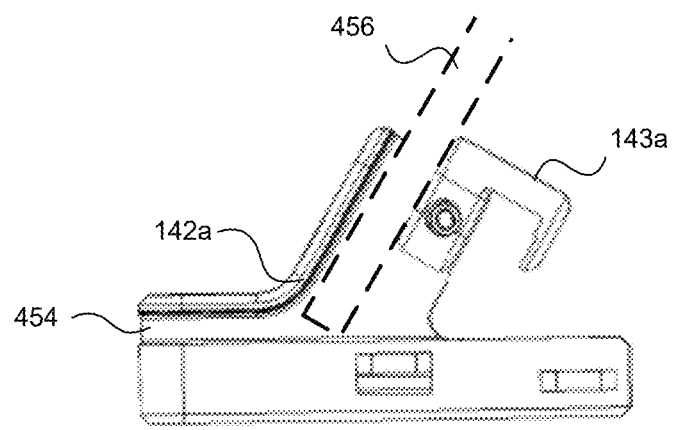

FIG. 4D shows a side view of left brace 124a with left rotating arm 143a in the second position and the lower edge of a tablet 456 shown in outline at a lower location than shown in FIG. 4C. With left rotating arm 143a rotated to clear the lower edge of tablet 456 in this position, tablet 456 extends down farther in first slot 452 and may be in contact with a keyboard that is captured in second slot 454.

Figure 4E:
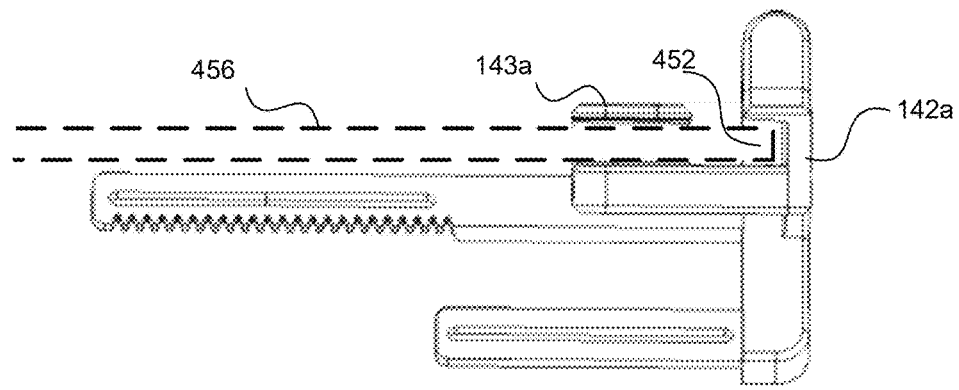
Figure 4F:
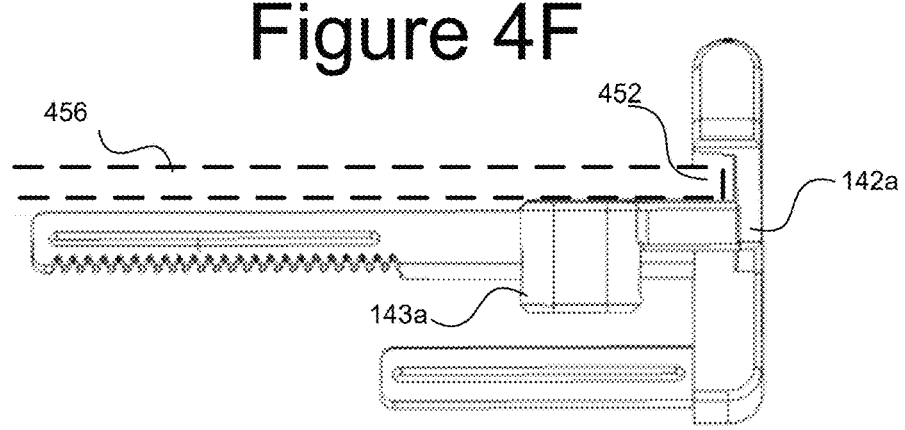

FIGS. 4E-F show views along the plane of a tablet, with tablet 456 shown in outline, illustrating how the edge of tablet 456 is engaged in first slot 452. FIG. 4E shows left rotating arm 143a in the first position in which it supports and secures tablet 456 while FIG. 4F shows left rotating arm 143*a* in the second position in which it is clear of the lower edge of tablet 456 (e.g., does not engage or secure the lower edge of tablet 456).

Figure 4G:
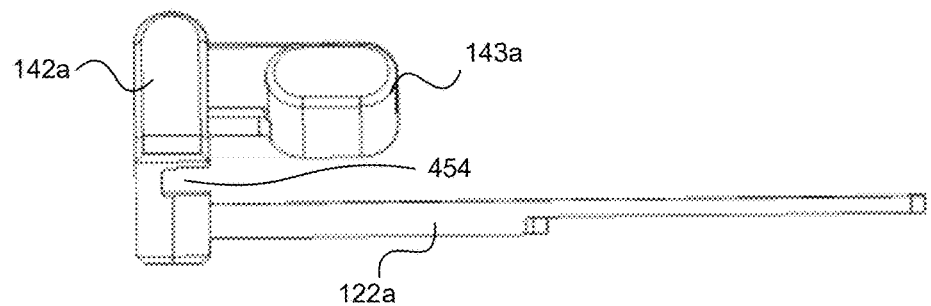

FIG. 4G shows a horizontal view of left arm 122*a* and left brace 142*a* with left rotating arm 143*a* in the first position. FIG. 4G shows second slot 454, which extends horizontally to capture a left edge of a keyboard. In some cases, such an unobstructed slot may allow movement of a keyboard along a horizontal plane, which may present a security problem (e.g., may allow a keyboard to be moved sufficiently to disengage from front brace 142*c*).

Figure 4H:
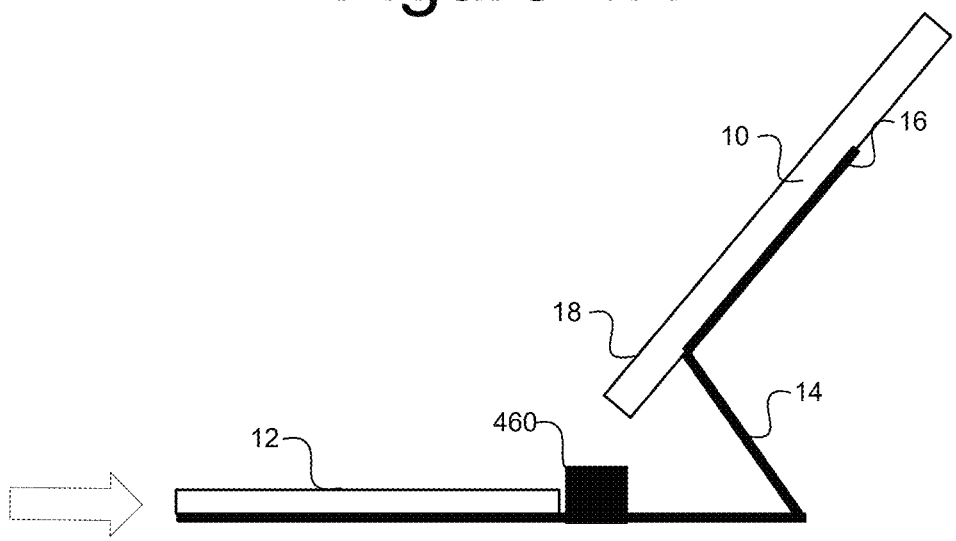

In order to ensure that a keyboard cannot slide along a horizontal plane to allow disengagement, one or more obstructions may be provided that prevent such movement. FIG. 4H shows keyboard 12 in side-view, with an arrow showing the direction of movement to be inhibited. FIG. 4H shows an obstruction 460 (or stop) located behind keyboard 12 so that movement of keyboard 12 in the direction of the arrow is prevented (no mount is shown in this view for clarity).

While some keyboards may have dimensions that ensure that they cannot be moved in this way (e.g., keyboard 12 shown in FIG. 1C may extend to back support 134, which may serve as an obstruction to limit backward movement of the keyboard) other keyboards (e.g., smaller keyboards such as shown in FIGS. 1A-B) may be susceptible to such movement. It may be desirable to provide one or more obstacles or stops such as obstacle 460, to prevent movement of smaller keyboards without preventing insertion of larger keyboards (e.g., keyboards that extend further back as shown in FIG. 1C). In order to facilitate keyboards having different dimensions, such obstacle(s) may be removable, foldable, retractable, rotatable or otherwise configurable to facilitate keyboards of different dimensions.

Figure 4I:
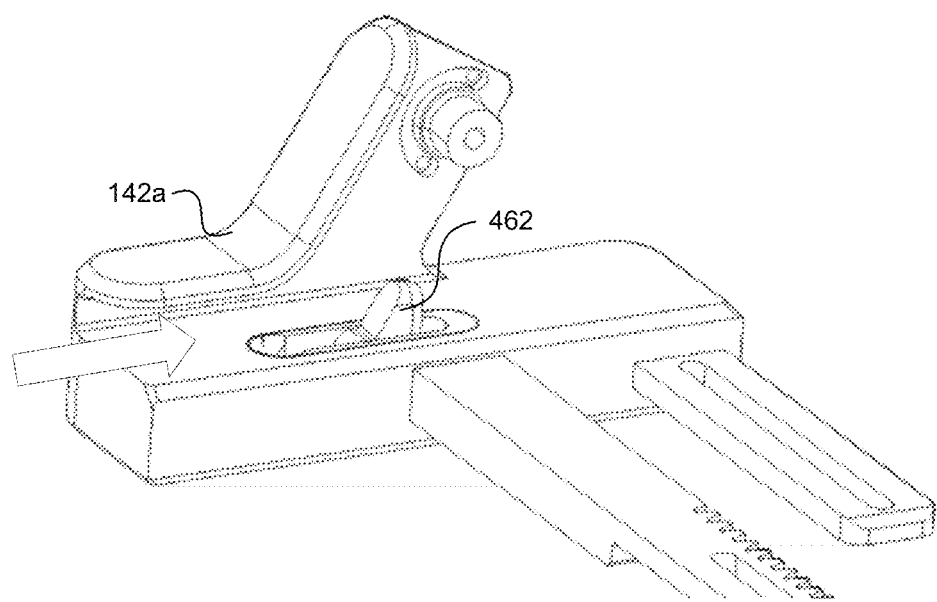

FIG. 4I shows an example of a rotatable obstacle 462 located in left brace 142*a* to prevent movement of a keyboard along the direction of the arrow (e.g., away from a user). Rotatable obstacle 462 is shown in a deployed configuration in which it blocks slot 454. Rotatable obstacle 462 can also be rotated to an undeployed configuration to allow insertion of a larger keyboard.

Figure 4J:
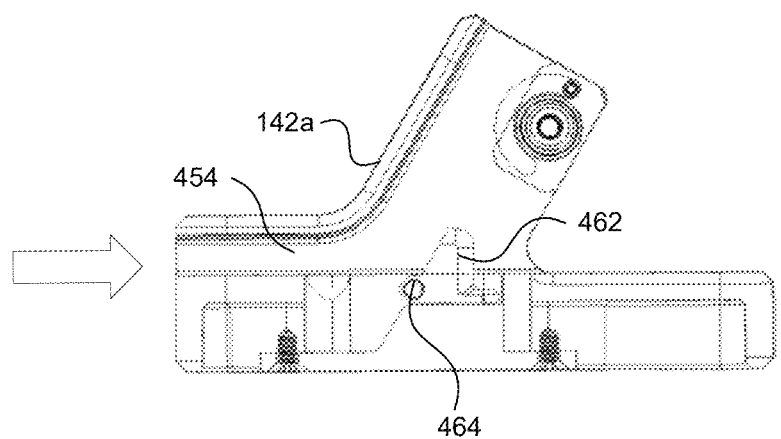

FIG. 4J shows left brace 142*a* and rotatable obstacle 462 in cross-section with rotatable obstacle 462 in the deployed configuration in which it blocks slot 454 to prevent movement in the direction indicated by the arrow. FIG. 4J shows axis 464, which is the axis of rotation of rotatable obstacle 462.

Figure 4K:
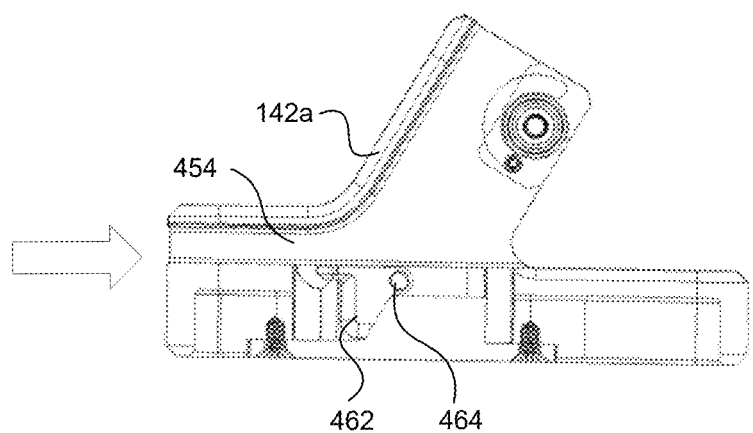

FIG. 4K shows left brace 142*a* and rotatable obstacle 462 in cross-section with rotatable obstacle 462 in the undeployed configuration in which it leaves slot 454 open to allow insertion of a keyboard that extends back (to the right in FIG. 4K) beyond rotatable obstacle 462. A similar obstacle may be provided in right brace 142*b* and/or at any other location(s) to prevent sliding a keyboard in the direction indicated. Rotatable obstacle 462 may be rotatable for configuration when no keyboard is present and may be prevented from rotation when a keyboard is present (e.g., with a keyboard in place, the keyboard may block rotation of rotatable obstacle 462).

Figure 4L:
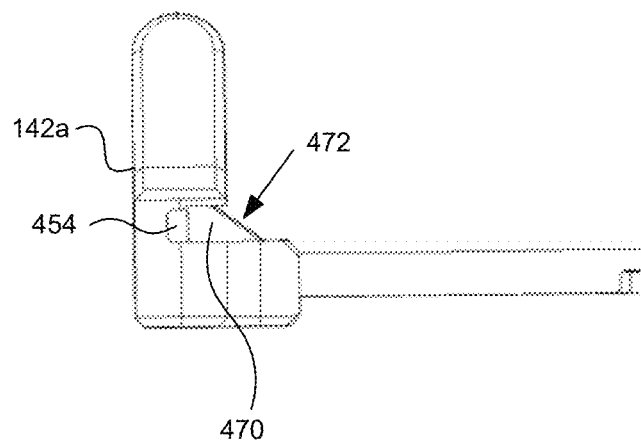

In an example, a retractable obstruction is provided to prevent movement of a keyboard (e.g., an obstruction located similarly to rotatable obstacle 462 that retracts in a straight-line movement instead of rotating). FIG. 4L shows an example of left arm 142*a* with a retractable obstacle 470 in front-view showing how retractable obstacle 470 blocks slot 454 when it is deployed (e.g., similar view to FIG. 4G with slot 454 blocked). Retractable obstacle 470 includes inclined surface 472, which may act as a ramp so that as left arm 142*a* is retracted to secure a keyboard, the keyboard generates a downward force on retractable obstacle 470, which may cause retractable 470 to be depressed or retracted into an undeployed configuration.

Figure 4M:
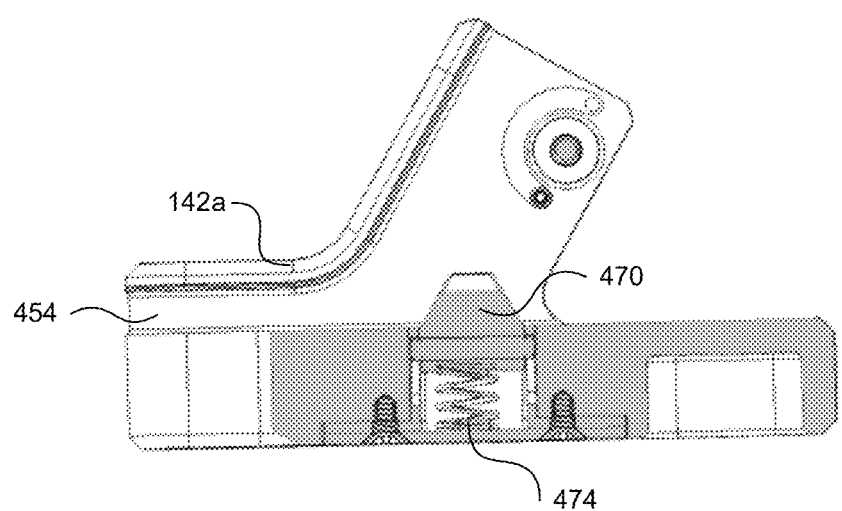

FIG. 4M shows left brace 142*a* in cross-section including retractable obstacle 470 in the deployed configuration. A spring 474 is provided to provide a force that maintains retractable obstacle 470 in the deployed configuration. When left arm 142*a* is retracted to capture a keyboard that extends to retractable obstacle 470, inclined surface 472 produces a downward force that pushes retractable obstacle 470 downward allowing full engagement of left brace 142*a*. When retractable obstacle 470 is pushed down in this way, spring 474 is compressed. Subsequently, when the keyboard is removed, spring 474 pushes retractable obstacle 470 back to the deployed configuration. In this way, retractable obstacle 470 automatically resets (e.g., without manual intervention). When a smaller keyboard is used, retractable obstacle 470 remains deployed and prevents movement of the keyboard back along slot 454.

In some examples of mount 102, front arm 144 and top arm 136 are extendable and retractable separately from left and right arms 122*a*, 122*b* and may have separate mechanisms to enable/prevent extension and/or retraction. In some examples, latching ratchet mechanisms are provided that prevent extension of the arms in a first configuration (e.g., to secure a tablet and/or keyboard) and enable extension of the arms in a second configuration (e.g., to release a tablet and/or keyboard). For example, front arm 144 may be coupled to main body 112 by a first latching ratchet mechanism that prevents extension of the front arm in a first configuration and enables extension of the front arm in a second configuration and top arm 136 may be coupled to the back support 134 by a second latching ratchet mechanism that prevents extension of the top arm in the first configuration and enables extension of the top arm in the second configuration.

Figure 5B:
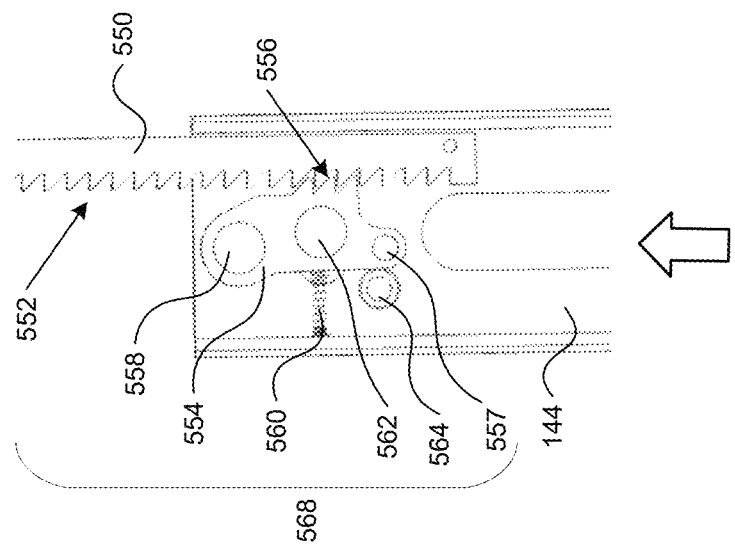
FIGS. 5A-D illustrate examples of an arm with a latching ratchet mechanism.
Figure 5A:
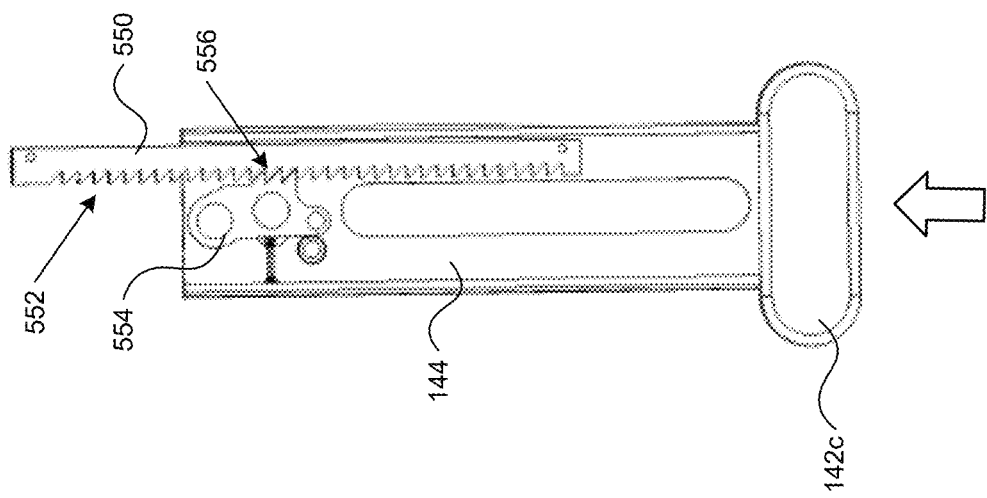

FIG. 5A shows an example of components of a latching ratchet mechanism that couples front arm 144 (and front brace 142*c*) to main body 112 (a similar or identical latching ratchet mechanism may couple top arm 136 to back support 134). Front arm 144 may be located in an arm guide (not shown in FIG. 5A), which constrains movement of front arm 144 to a linear path (e.g., linear extension and retraction with respect to main body 112). FIG. 5A shows a linear rack 550 that has a first plurality of teeth 552. Linear rack 550 may have a fixed location with respect to main body 112 (e.g., may be bolted, welded or screwed to main body 112 or formed of a component of main body 112). A pawl 554 is attached to front arm 144. Pawl 554 has a second plurality of teeth 556 to engage the first plurality of teeth 552 in the configuration shown (first configuration). While a pawl may be provided with as few as one tooth to provide ratcheting, multiple teeth (e.g., three teeth as illustrated) may provide a relatively strong ratcheting mechanism with relatively small teeth, which provide higher resolution (smaller increments of movement) than a larger tooth or teeth would.

FIG. 5B shows a more detailed view of the latching ratchet mechanism of FIG. 5A including first teeth 552 of linear rack 550 engaging second teeth 556 of pawl 554. Pawl 554 is rotatable about pivot 558 (e.g., pivot 558 may be a cylindrical shaft that extends from front arm 144 and extends through a cylindrical opening in pawl 554). Pawl 554 is biased by spring 560 to maintain engagement of second teeth 556 with first teeth 552 as shown in FIG. 5B. Front arm 144 may retract with respect to main body 112

(move up in the view of FIG. 5B) with pawl 554 rotating a small amount as it is displaced by first teeth 552 acting on second teeth 556. First teeth 552 and second teeth 556 engage to prevent extension in this configuration (first configuration) and thus form a ratchet mechanism. For example, first and second teeth may have a sawtooth pattern so that faces of opposing teeth are angled appropriately to generate a rotational force on pawl 554 when retracting front arm 144 but not when attempting to extend front arm 144.

A ball plunger 564 is provided in front arm 144 to capture a corresponding hole 557 in pawl 554 to maintain pawl 564 away from linear rack 550 in a second configuration. Ball plunger 564 may include a spring that provides sufficient force so that, when pawl 554 is rotated to a position in which ball plunger 564 is aligned with and engages hole 557, the force of spring 560 is insufficient to rotate pawl 554 back towards linear rack 550 (e.g., pawl 554 is latched in the second configuration by ball plunger 564). FIG. 5B also shows a pawl pin 562, which extends from pawl 554 and is used to move pawl 554 between first and second configurations (e.g., to rotate pawl 654 between the unlatched first configuration to the latched second configuration). The mechanism shown in FIGS. 5A-C may be latched and provides ratcheting capability (e.g., in one configuration) and may be referred to as a "latching ratchet mechanism" 568.

Figure 5D:
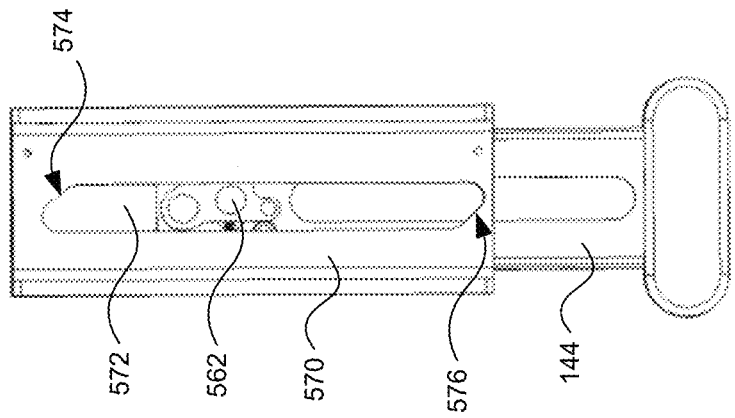
Figure 5C:
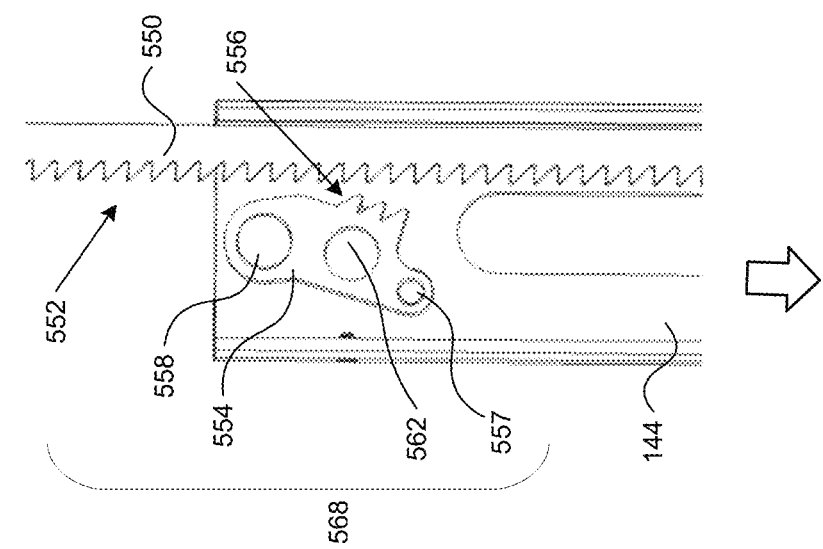

FIG. 5C shows latching ratchet mechanism 568 in the second (latched) configuration with ball plunger 564 (not visible in this view) engaging hole 557 to maintain pawl 554 in the position shown with second teeth 556 clear of first teeth 552 (e.g., separated by a gap) so that no ratcheting occurs and front arm 144 is free to retract and extend (move down the page in the view of FIG. 5C).

In examples of the present technology, latching ratchet mechanism 568 may be changed between first and second configurations (latched and unlatched) by exerting forces on pawl pin 562 to rotate pawl 554 into the second (latched) configuration and rotate it out of the second (latched) configuration into the first (unlatched or ratcheting) configuration. For example, pawl pin 562 may engage cam surfaces that apply forces to cause rotation of pawl 554 between the first (latched) configuration of FIG. 5B and the second (unlatched) configuration of FIG. 5C.

FIG. 5D shows an example in which front arm 144 is in an arm guide 570, which includes a slot 572 with a first cam surface 574 and a second cam surface 576. Pawl pin 562 extends through slot 572 so that it encounters first cam surface 574 and second cam surface 576. Pawl pin 562 is configured to engage first cam surface 574 to rotate pawl 554 away from linear rack 550 into engagement with ball plunger 564 when it reaches the inner limit of slot 572. First cam surface 574 may act as a ramp that pushes pawl pin 562 away from linear rack 550 (to the left in FIG. 5D) as front arm 144 approaches its inner limit of travel. Pawl pin 562 is configured to engage second cam surface 576 to rotate pawl 554 out of engagement with ball plunger 564 towards linear rack 550 at the outer limit of slot 572. Second cam surface 576 may act as a ramp that pushes pawl pin 562 toward linear rack 550 (to the right in FIG. 5D) as it approaches its outer limit of travel.

While the example of FIGS. 5A-D is directed to front arm 144, any arm may be implemented with such a latching ratchet mechanism (e.g., left arm 122a, right arm 122b and/or top arm 136). In an example, left and right arms 122a, 122b are implemented as shown in FIGS. 3B-F while front arm 144 and top arm 136 are implemented using separate latching ratchet mechanisms as shown in FIGS. 5A-D (e.g., top arm 136 may have a second latching ratchet mechanism that is similar to first latching ratchet mechanism 568 shown with respect to front arm 144.

An arm that has a latching ratchet mechanism (e.g., front arm 144 having latching ratchet mechanism 568) may be retracted to engage an item of value (e.g., tablet and/or keyboard) in order to secure it. When such an arm is in the first configuration and is retracted (moved inward with respect to main body 112) to engage an item (e.g., the edge of a tablet or keyboard) it cannot be extended without retracting the arm to its inner limit of travel, which is not possible while it engages the item (e.g., engaged item prevents further retraction). In order to extend such an arm, the item may be removed (e.g., by sliding it out of a mount in a different direction) and the arm may be retracted to its inner limit of travel to latch the pawl (e.g., pawl 554) and thereby disengage the ratchet and allow extension. The arm may then be returned to the first configuration by extending it to its outer limit. This arrangement can be configured to secure different items with a wide range of dimensions without significant intervention (e.g., remove one item, fully retract and extend the arm, insert a second item and retract the arm to engage the second item) and without the use of tools. For example, unlocking left and right arms 122a, 122b using knob 162 may allow left and right arms 122a, 122b to be extended thereby disengaging left and right braces 142a, 142b from one or more item (e.g., tablet and/or keyboard). The item(s) may then be removed from mount 102 (e.g., slid out to one side). Then, with the item(s) removed, front arm 144 and top arm 136 may be retracted fully to change to the second (non-ratcheting) configuration and extended fully to change back to the first (ratcheting) configuration. With all arms extended, item(s) may be inserted and all arms may be retracted until corresponding braces engage the item(s).

Braces may be configured to accommodate a wide range of different items without affecting access to the items. For example, a tablet may include a camera, which may be located in the middle of the top edge of the tablet. A touchpad or other input device may be provided at or near the outer edge of a keyboard and/or other built in features may be provided at central locations along edges of electronic items.

Figure 6:
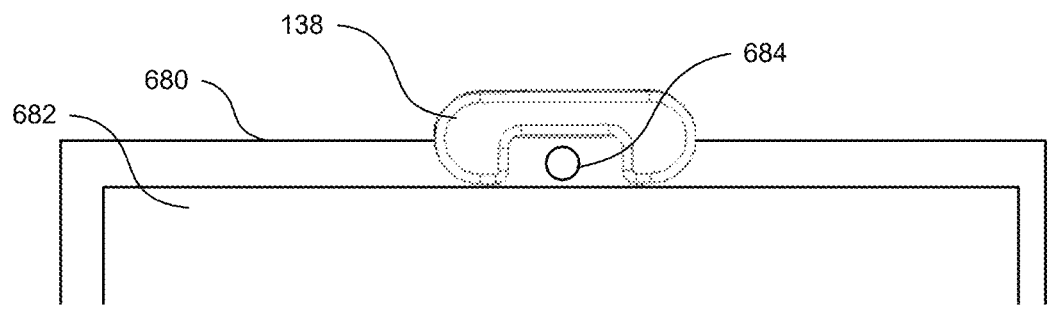
FIG. 6 illustrates examples of braces with a cutout for a tablet camera.

FIG. 6 shows an example of top brace 138 engaging the top edge 680 of a tablet 682. Tablet 682 includes a camera 684 that is located at the middle of top edge 680. Top brace 138 includes a cut out to accommodate camera 684 (e.g., to leave camera 684 uncovered so that its field of view is not obstructed. Other tablet features (e.g., additional camera(s), microphone(s) and/or speaker(s)) may be similarly accommodated by configuring top brace 138 (and/or other brace(s)) with appropriate cut out(s).

Figure 7:
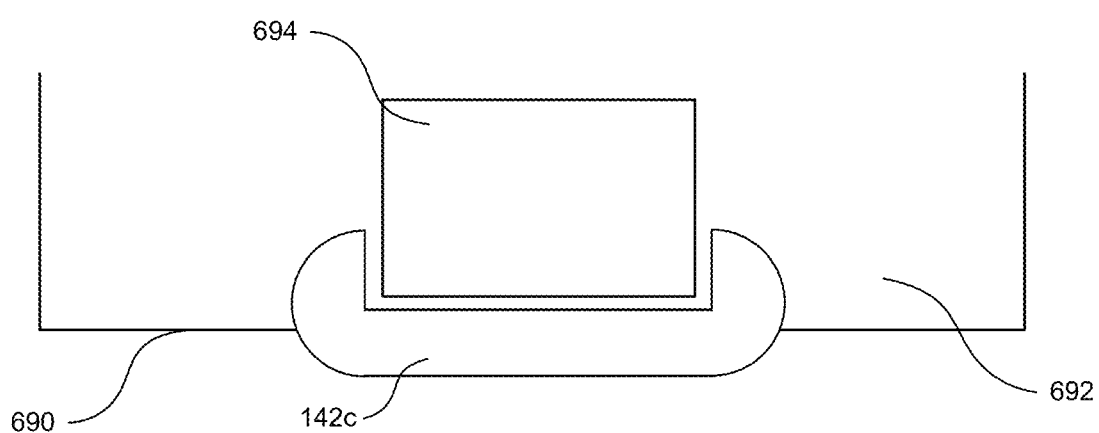
FIG. 7 illustrates an example of a brace with a cutout for a touchpad.

FIG. 7 shows an example of front brace 142c engaging front edge 690 of a keyboard 692. Keyboard 692 includes a trackpad 694, which occupies a central area along front edge 690. Front brace 142c includes a cut out to accommodate trackpad 694 (e.g., to leave trackpad 694 uncovered so that a user can touch and use it). Other keyboard features may be similarly accommodated by configuring front brace 142c (and/or other brace(s)) with appropriate cut out(s).

Ratcheting buttons such as ratcheting buttons 137, 139 may allow tablets of different thickness to be secured (e.g., by pushing a thinner tablet into engagement with corresponding braces and eliminating wiggle room that might allow a tablet to be worked loose and/or a tool to be inserted). Ratcheting buttons are not limited to the locations shown and may be implemented in any location (e.g., in main body 112 and/or arms and/or braces). Ratcheting buttons are not limited to the uses described here and may be used to secure items other than a tablet (e.g., a keyboard).

Figure 8:
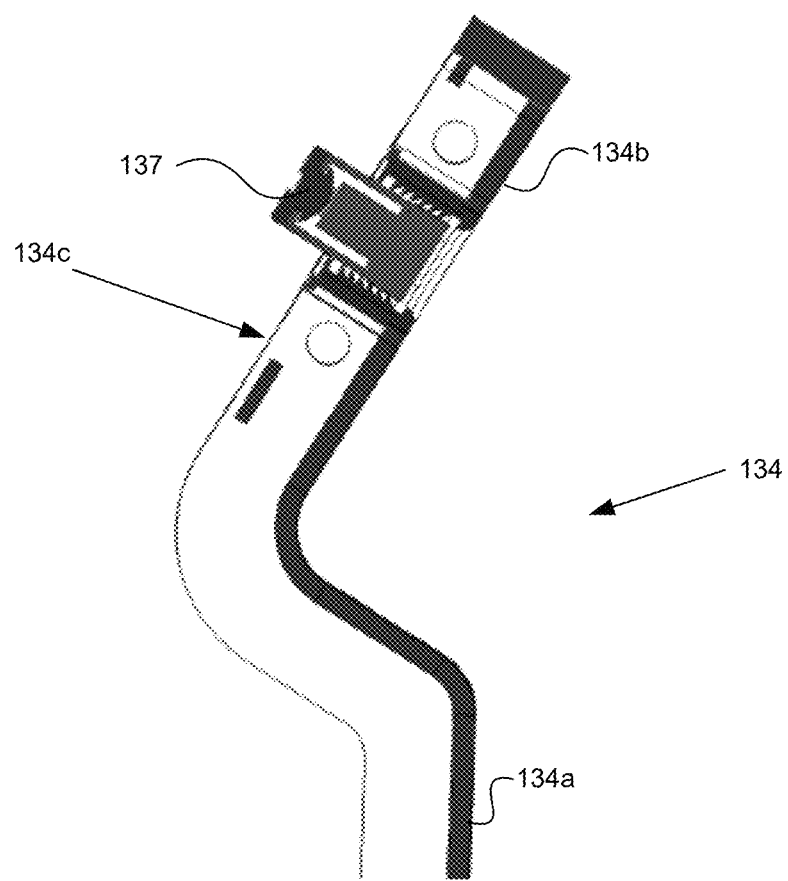
FIG. 8 illustrates an example of a ratcheting button in a back support of a mount.

FIG. 8 shows a cross section of ratcheting button 137 in upper portion 134*b* of back support 134. Ratcheting button 137 is shown extending beyond back support surface 134*c*. While some tablets may lie flush with back support surface 134*c* while adequately engaged by braces, other tablets (e.g., thinner tablets) may not be adequately engaged if they lie flush with back support surface 134*c* (e.g., there may be significant wiggle room). One or more ratcheting button such as ratcheting button 137 may be used to reduce or eliminate wiggle room for tablets having a range of thicknesses and may thus provide additional flexibility and security. In an example, a ratcheting button may be pushed out (e.g., towards an item such as a tablet) when the item is in place but may not be pushed in (e.g., away from the item) while the item is in place. Thus, ratcheting buttons used to secure an item may only be releasable when the item is removed (e.g., after arms are extended and the item is removed).

Figure 9A:
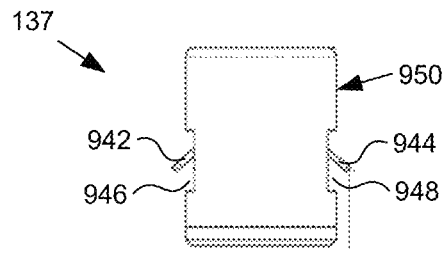
FIGS. 9A-C illustrate an example of a ratcheting button.
Figure 9C:
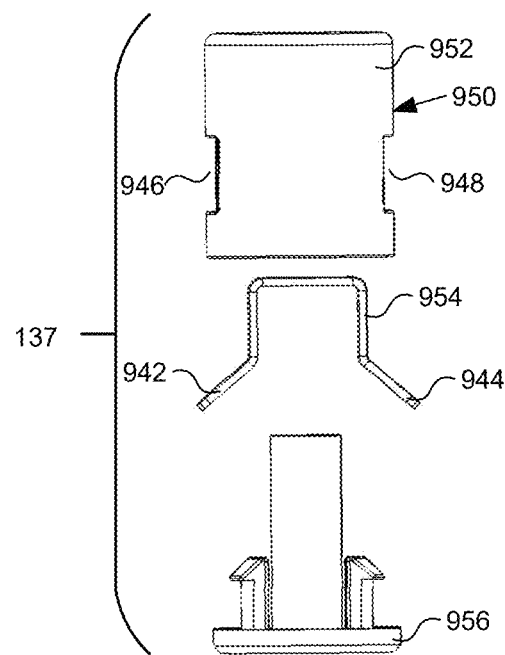
Figure 9B:
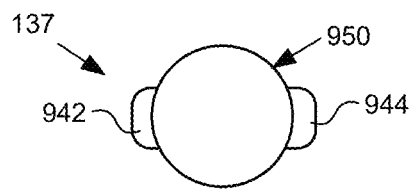

FIGS. 9A-B illustrate an example of ratcheting button 137 that may be used to implement aspects of the present technology. Ratcheting button 137 includes a first pawl 942 and a second pawl 944 extending from opposite sides of ratcheting button 137. In other examples, different numbers of pawls may be provided (e.g., one pawl, or more than two pawls). Ratcheting button 137 has a cylindrical shape with first pawl 942 extending through a first opening 946 and second pawl 944 extending through a second opening 948 in a cylindrical outer wall 950 so that they both extend beyond cylindrical outer wall 950 (e.g., beyond the radius of cylindrical outer wall 950).

FIG. 9B shows a top-down view of ratcheting button 137 that shows how a first pawl 942 and a second pawl 944 extend beyond a cylindrical outer wall 950 of ratcheting button 137. In this arrangement, first pawl 942 and second pawl 944 are configured to engage one or more ratchet surface(s) that may be present on a cylindrical inner wall of a corresponding hole (e.g., a hole that extends through upper portion 134*b* of back support 134).

FIG. 9C shows an exploded view of ratcheting button 137 that includes a cylindrical thimble portion 952 with first opening 946 and second opening 948 on opposite sides of cylindrical outer wall 950. Ratcheting button 137 includes spring 954 (to be located in the cylindrical thimble portion 952), with a first end (to extend through first opening 946) to form first pawl 942 and a second end (to extend through second opening 948) to form second pawl 944. Spring 954 may be formed of a suitable spring material (e.g., a metal, such as steel, or an alloy) so that it is elastic and can be deformed, or deflected, and return to its original shape. Thus, first pawl 942 and second pawl 944 may be deflected inwards (towards the center of ratcheting button 137) and return to their prior configuration as ratcheting button is moved in a hole with one or more ratchet surface. A thimble cap 956 is provided to maintain spring 954 in a specified location, with first pawl 942 extending through first opening 946 and second pawl 944 extending through second opening 948 and to provide a surface for applying upward force on ratcheting button 137.

Figure 10A:
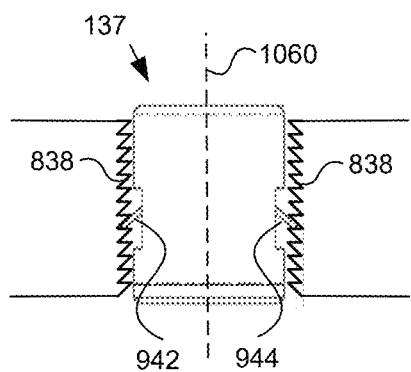
FIGS. 10A-B illustrate an example of a ratcheting button in a push-through configuration.
Figure 10B:
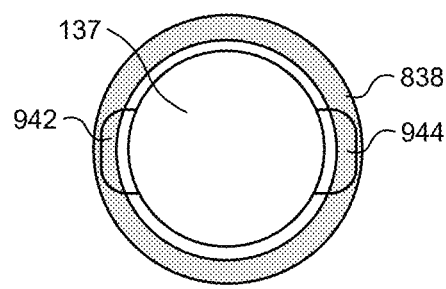

FIGS. 10A-B illustrate ratcheting button 137 and shows how pawls 942, 944 engage ratchet surface 838. FIGS. 10A-B shows ratchet surface 838 extending circumferentially (through 360 degrees) about a central axis 1060 of a hole to engage first pawl 942 and second pawl 944. The hole is cylindrically symmetric about central axis 1060 so that ratchet surface 838 can be seen on both sides of ratcheting button 137 in FIG. 10A and ratchet surface 838 thus engages both pawls. Ratcheting button 137 is generally cylindrical, with cylindrical outer wall 950 being defined by an axis that, when inserted in a hole, coincides with central axis 1060. Movement of ratcheting button 137 is generally upwards along central axis 1060. Ratcheting button 137 fits in the hole with some small clearance between cylindrical outer wall 950 and teeth of ratchet surface 838. Indentations between teeth of ratchet surface 838 allow first pawl 942 and second pawl 944 to extend beyond cylindrical outer wall 950 and engage ratchet surface 838. When pushed upwards, first pawl 942 and second pawl 944 are deflected inwards (towards central axis 1060) by teeth of ratchet surface 838 as spring 954 bends and then spring outwards into indentations of ratchet surface 838 (FIG. 10B shows ratchet surface 838 as a shaded ring indicating the depth of teeth and indentations). When pushed downwards, first pawl 942 and second pawl 944 engage ratchet surface 838 and prevent downward movement of ratcheting button 137. Thus, the combination of first pawl 942, second pawl 944 and ratchet surface 838 provide a ratchet mechanism to prevent downward movement of ratcheting button 137 within corresponding hole 830. Because ratcheting button 137 cannot move down, returning ratcheting button 137 to a lower position (e.g., to allow insertion of another portable electronic device) may include pushing the ratcheting button 137 all the way up and out of the hole and then reinserting it from below in what may be referred to as a "push-through" configuration, which can only be performed when a security mount is not being used to secure a portable device.

While the example shown in FIGS. 10A-B includes a ratcheting button with a cylindrical outer wall that fits in a cylindrical hole, other shapes may also be used (e.g., square, rectangular, polygonal, elliptical, or other). A ratcheting surface or ratcheting surfaces may be configured according to the shape used and the location(s) of any pawl(s).

In an alternative to the push-through arrangement above, a ratcheting button (e.g., ratcheting button 137) may have two configurations. In a first configuration, the ratcheting mechanism prevents downward movement while in a second configuration the ratcheting mechanism is disengaged to enable downward movement.

FIGS. 11A-D illustrate an example of a hole 1170 (e.g., a hole through upper portion 134*b* of back support 134 or through any other component of mount 102) containing ratcheting button 137. Hole 1170 has a cylindrical inner wall including a first ratchet surface 1172 and a second ratchet surface 1174 on opposite sides of hole 1170 (with shading to indicate depth of teeth/indentations). First and second ratchet surfaces 1172, 1174 are separated by a first recess 1176 and a second recess 1178, where no teeth are located so that no ratchet surface is present (e.g., an inner wall may be smooth).

Figure 11A:
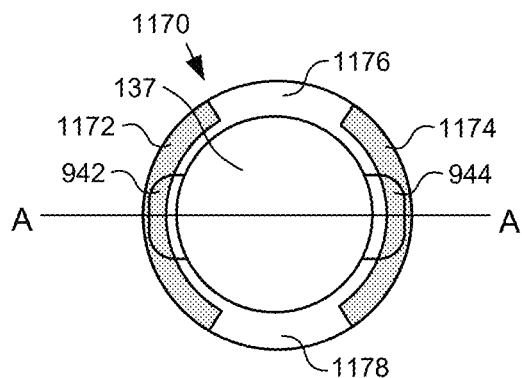
FIGS. 11A-G illustrate an example of a ratcheting button in a captured configuration.
Figure 11B:
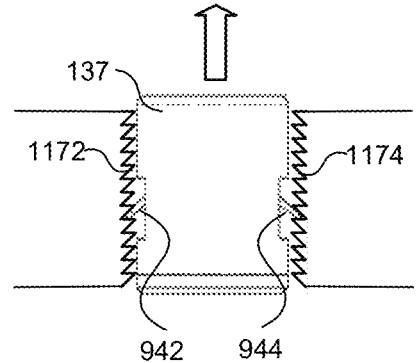

In the configuration illustrated in FIGS. 11A-B, ratcheting button 137 has a first orientation (with pawls extending on either side in this view) in which first pawl 942 engages first ratchet surface 1172 and second pawl 944 engages second ratchet surface 1174 to prevent downward movement of ratcheting button 137. FIG. 11A shows a top-down view and FIG. 11B shows a cross sectional view along the plane marked A-A in FIG. 11A. In this orientation, ratcheting button 137 can only be moved upwards and cannot be moved downwards.

Figure 11C:
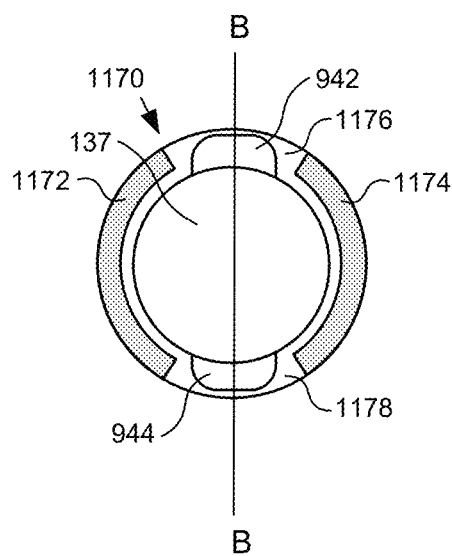
Figure 11D:
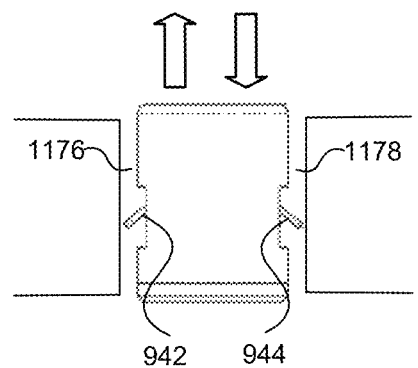

Ratcheting button 137 is rotatable within hole 1170 and FIGS. 11C-D illustrate ratcheting button 137 in a second configuration (second orientation) that results from rotating it about ninety degrees (90°). FIG. 11C shows a top-down view and FIG. 11D shows a cross sectional view along the plane marked B-B in FIG. 11C. When ratcheting button 137 is in the second orientation shown, first pawl 942 aligns with first recess 1176 and second pawl 944 aligns with second recess 1178 so that first and second pawls 942 and 944 do not engage first and second ratchet surfaces 1172 and 1174. In this orientation, ratcheting button 137 may be moved up or down. This may allow ratcheting button 137 to be repositioned (lowered) for insertion of an item (e.g., tablet) without removing it from hole 1170. In some cases, a ratcheting button may be captured within such a hole with downward movement enabled by rotating the ratcheting button to an appropriate orientation. Such a ratcheting button that can be repositioned without removal from a corresponding hole and/or is captured within the corresponding hole, which reduces the risk of losing or damaging the ratcheting button.

Features may be provided on ratcheting button 137 to facilitate access for rotation of ratcheting button 137 from above so that any such features are not accessible when a portable electronic device is present. For example, features for engaging a tool (e.g., a slot for a screwdriver) or for rotation by hand (e.g., a surface that is textured for enhanced grip) may be provided on the top of ratcheting button 137 and not on the bottom (which may be smooth), so that the features that allow for manual rotation of the ratcheting button can only be accessed when a security mount that includes hole 1170 and ratcheting button 137 is not being used to secure a portable electronic device.

Figure 11E:
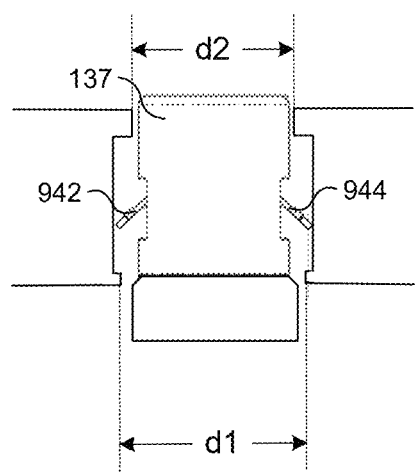
Figure 11F:
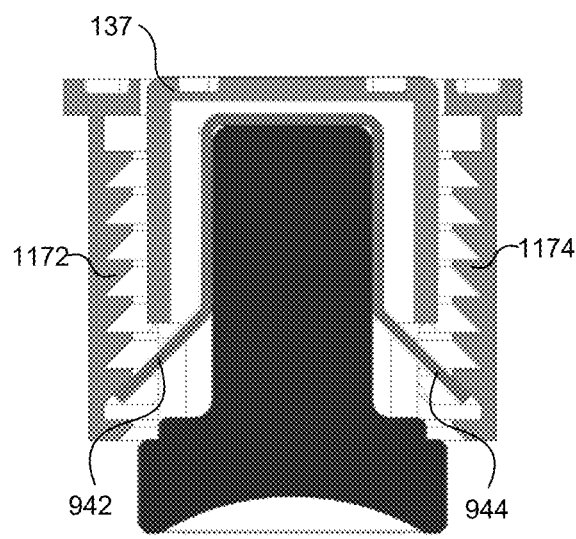

FIGS. 11E-F show examples of ratcheting button 137 captured within a hole that includes a lower opening having a diameter of d1 and an upper opening having a diameter of d2. Diameters d1 and d2 may be sufficiently narrow to ensure that ratcheting button 137 cannot be removed from the hole after insertion. For example, pawls 942, 944 and/or other features of ratcheting button 137 may extend beyond diameter d2 to ensure that ratcheting button 137 cannot be pushed upwards beyond an upper limit. Pawls 942, 944 and/or other features of ratcheting button 137 may extend beyond diameter d1 to ensure that ratcheting button 137 cannot be pushed downwards beyond a lower limit (e.g., after initial insertion, pawls 942, 944 in their extended configuration may prevent removal in a downward direction).

FIG. 11F shows a cross-sectional view of an implementation of ratcheting button 137 including pawls 942, 944 engaging first and second ratchet surfaces 1172 and 1174, with ratcheting button 137 captured so that it cannot be removed. Ratcheting button 137 may remain captured within the hole regardless of rotation (e.g., regardless of whether pawls are aligned with ratchet surfaces or not).

In an example implementation, rotation of a ratcheting button (e.g., rotation between an orientation in which pawls engage ratchet surfaces and an orientation in which pawls are disengaged) may only be enabled when the ratcheting button is one or more vertical position. For example, when a ratcheting button is at or near the top of its vertical range and/or at or near the bottom of its vertical range, it may be rotatable. Otherwise, rotation may be prevented to avoid rotation and lowering of a ratcheting button that has been ratcheted upwards to engage an electronic device. With no item in place (e.g., after removal of an electronic device) such a ratcheting button may be raised and rotated to disengage pawls so that it can be lowered. Subsequently, it may be rotated to engage pawls so that it can be raised to secure an electronic device.

Figure 11G:
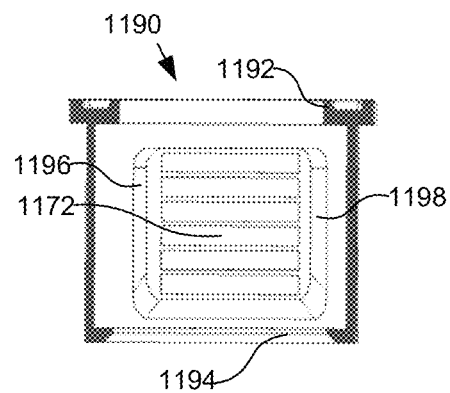

FIG. 11G shows an example implementation of a hole 1190 with features to limit movement of a ratcheting button.

FIG. 11G shows a cross sectional view of hole 1190 that includes a flange 1192 extending about an upper part of hole 1190 to reduce the diameter of the upper part of hole 1190 (e.g., to a diameter d2 as shown in FIG. 11E) and a flange 1194 extending about a lower part of hole 1190 to reduce the diameter of the lower part of hole 1190 (e.g., to a diameter d1 as shown in FIG. 11E). Flanges 1192 and 1194 may capture a ratcheting button in hole 1190. FIG. 11G also shows first ratchet surface 1172 on a portion of the inner wall of hole 1190 (an opposing second ratcheting surface is not visible in this view). A first sidewall 1196 and second sidewall 1198 extend vertically along sides of first ratchet surface 1172 to constrain a pawl (e.g., first pawl 942 or second pawl 944) and prevent rotation of a ratcheting button when a pawl is engaged with first ratchet surface 1172. First ratchet surface 1172 and sidewalls 1196, 1198 do not extend up to flange 1192 or down to flange 1194 so that there are gaps at the top and bottom to allow disengagement of pawls and rotation of a ratcheting button. While this provides an example of a hole configured to capture a ratcheting button and limit its rotation, other configurations may also be used. In some cases, sidewalls 1196 and 1198 may be unnecessary and friction of pawls 942 and 944 may be sufficient to prevent rotation. Sufficient space may be provided to allow rotation only at or near limits of travel (e.g., at or near maximum height and minimum height).

An adjustable mount such as mount 102 may be adapted to a wide range of items such as combinations of tablets and keyboards having various different dimensions. Some of the adjustments that may be made to secure items having different dimensions include retraction of left, right, top and front arms 112a, 112b, 136, 144, rotating left and right rotatable arms 143a, 143b according to the desired configuration (e.g., elevated tablet as in FIG. 1B or non-elevated tablet as shown in FIGS. 1A and 1C), and extension of ratcheting buttons 139, 139.

FIGS. 12A-H illustrate an example of a method of physically securing a tablet and a keyboard to a tabletop of a display table or other display surface using mount 102 that is adaptable to items having a wide range of dimensions and which may be performed rapidly and without requiring tools.

Figure 12A:
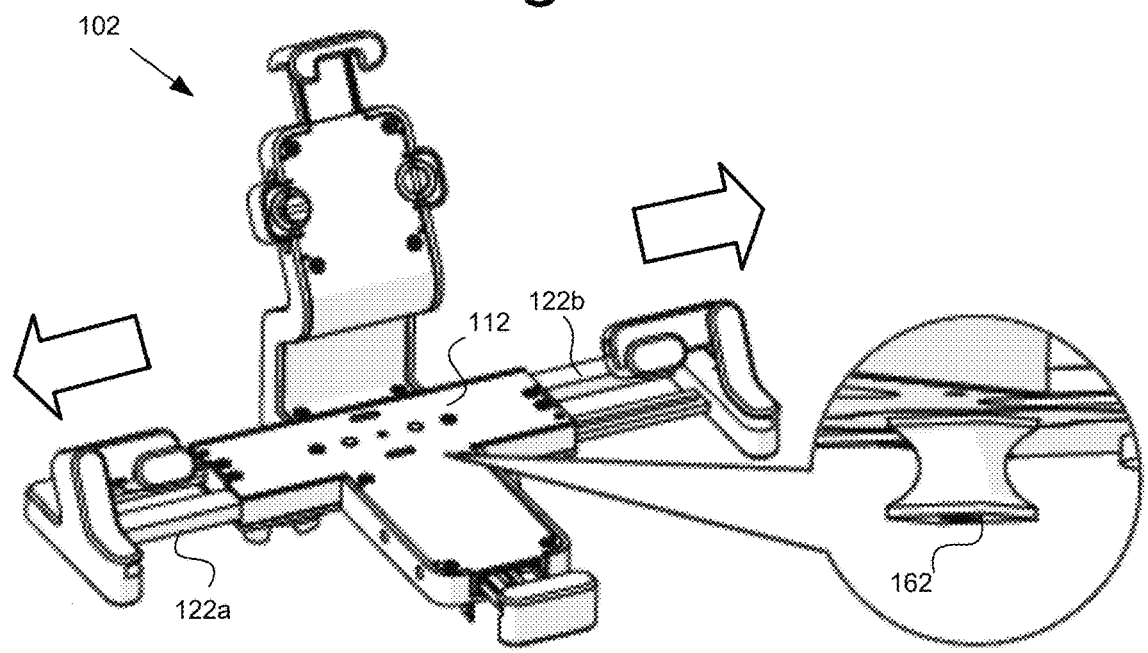
FIGS. 12A-H illustrate examples of steps to secure a tablet and a keyboard to a mount.

FIG. 12A shows extending left arm 122a and right arm 122b including manually releasing left and right arms 122a, 122b using knob 162 (shown in detail view). With knob 162 pulled down (e.g., disengaging locking element 338 from circular gear 332 as shown in FIG. 3F), left and right arms 122a, 122b may be extended with respect to main body 112 (e.g., by manually pulling one or both arms outwards, or they may be biased outwards by one or more springs).

Figure 12B:
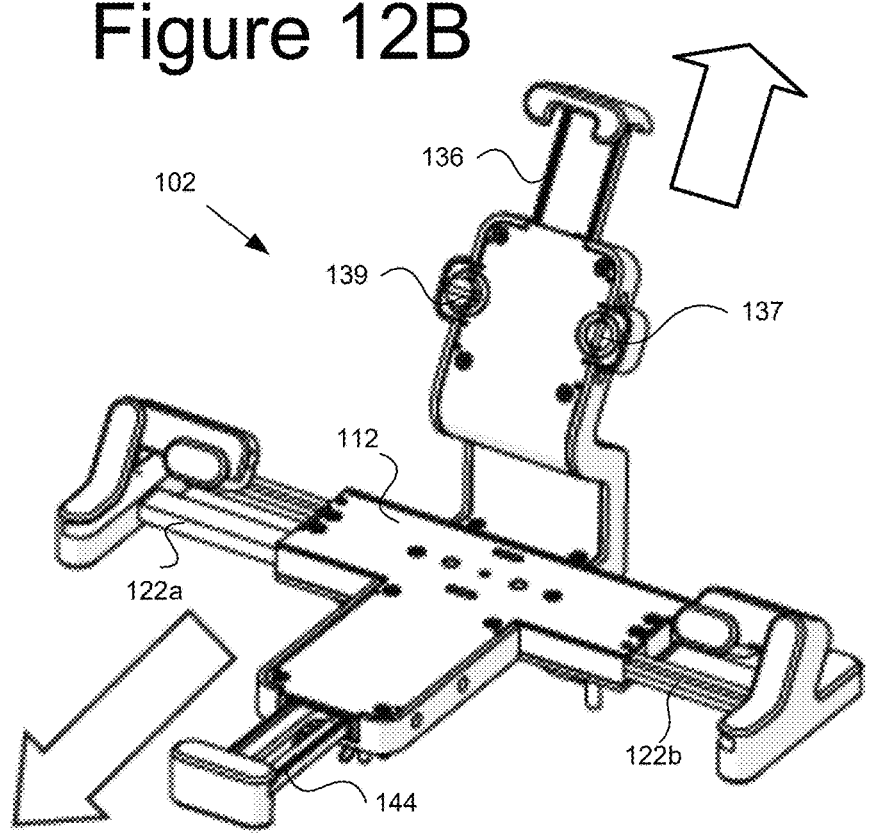

FIG. 12B shows extending top arm 136 and front arm 144. Top arm 136 and front arm 144 are both coupled to main body 112 by respective latching ratchet mechanisms (e.g., as illustrated in FIGS. 5A-D) and may be extended by first retracting them to their inner limit (e.g., pushing them all the way in until a click indicates that pawl 554 has moved from the first (ratchet) position to the second (latched) position). Top and front arms 136, 144 are extended to their outer limits (e.g., until another click indicates that pawl 554 has moved from the second (latched) position back to the first (ratchet) position). Ratcheting buttons 137, 139 may be fully retracted at this time (e.g., fully extended, then rotated to disengage pawls and then fully retracted as described with respect to FIGS. 11A-D).

Figure 12C:
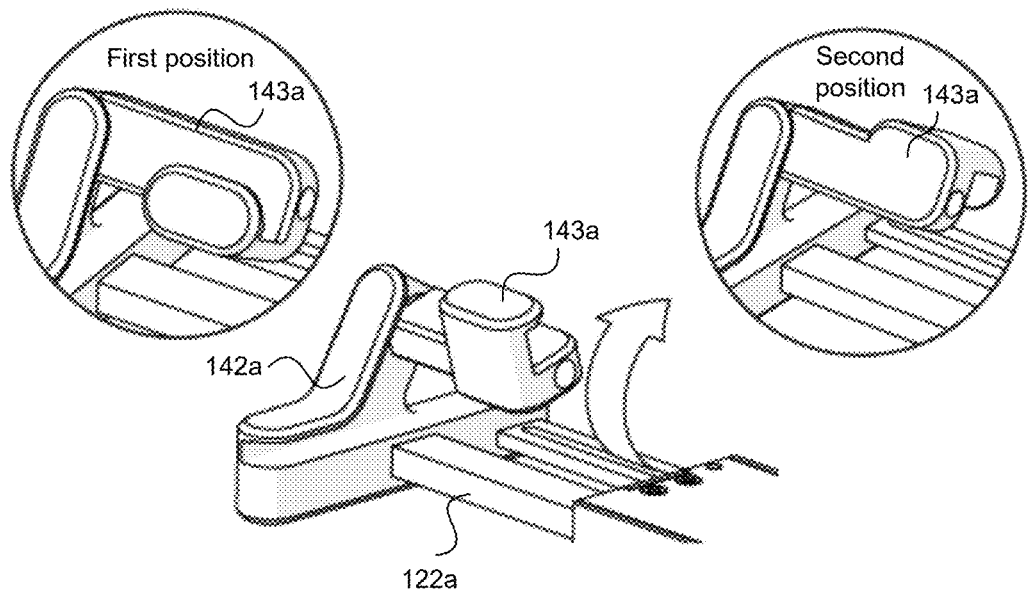

FIG. 12C shows configuring left rotating arm 143a (right rotating arm may be similarly configured). Left rotating arm 143a has two positions (e.g., as shown in FIGS. 4A-F and illustrated in the detailed views). In a first position (left detailed view) left rotating arm 143*a* is configured to extend hook-like features to engage the bottom edge of a tablet at a predetermined height above a tabletop (e.g., in configuration shown in FIG. 1B). In a second position (right detailed view), left rotating arm 143*a* is configured to allow a tablet to extend down to a level lower than left rotating arm 143*a* (e.g., in configurations shown in FIGS. 1A and 1C). Left rotating arm 143*a* is rotatable (e.g., manually) between the first position and the second position (e.g., through 180 degrees) to accommodate tablets having different configurations. Left rotating arm 143*a* may be rotated to the appropriate position for a given tablet prior to putting the tablet in place.

Figure 12D:
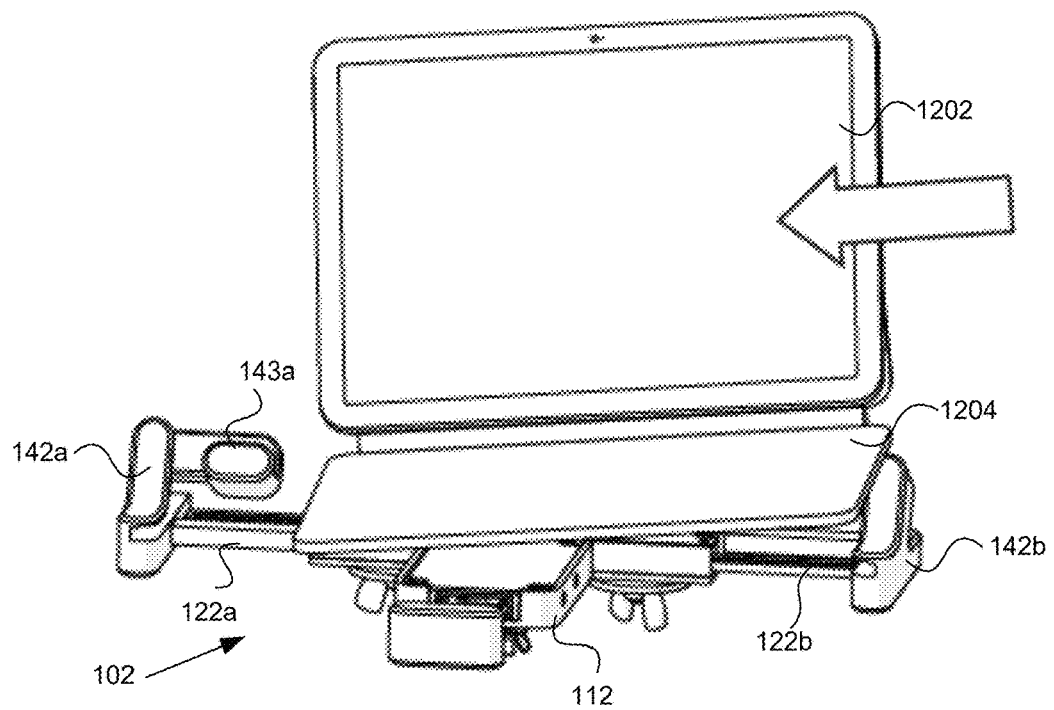

FIG. 12D shows an example of a tablet 1202 and keyboard 1204 being inserted from one side of mount 102. With left and right arms 122*a*, 122*b* sufficiently extended (e.g., fully, or near fully), rotating arms in the appropriate position (e.g., in first position to engage a lower edge of tablet 1202 as shown), tablet 1202 may be placed with its lower edge resting on left rotating arm 143*a* and right rotating arm 143*b* (not visible in this view) and keyboard 1204 may be placed on main body 112.

Figure 12E:
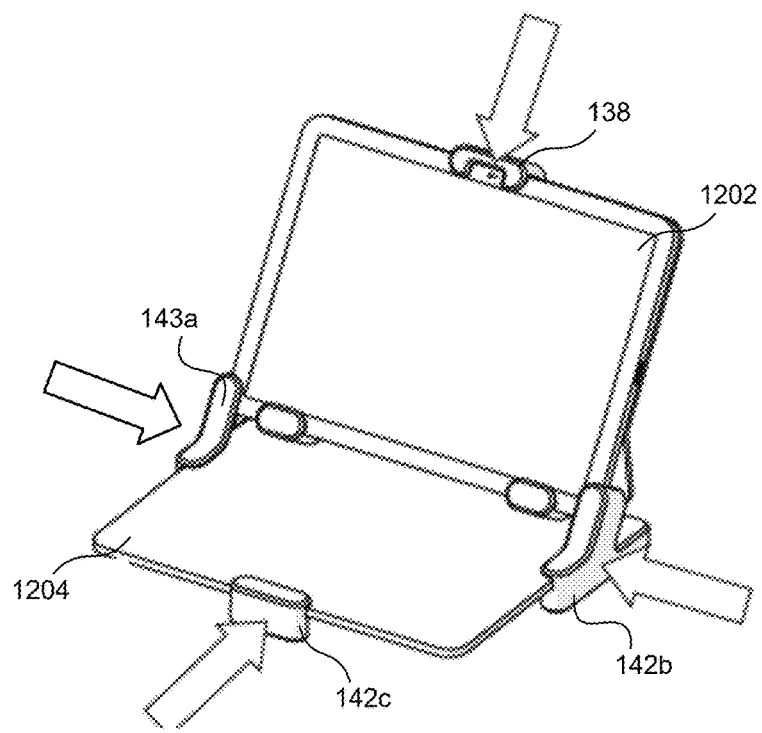

Subsequently, as shown in FIG. 12E, left arm 122*a* and right arm 122*b* are retracted in tandem (e.g., by manually pushing in one or both arms) so that tablet 1202 and keyboard 1204 are centered with respect to mount 102 and left and right braces 142*a*, 142*b* engage respective left and right edges of tablet 1202 and keyboard 1204. Front arm 144 is retracted to cause front brace 142*c* to engage the front edge of keyboard 1204. Top arm 136 is retracted to cause top brace 138 to engage the top edge of tablet 1202. Front arm 144 and top arm 136 should ratchet so that they cannot be extended (if they do not ratchet, they can be extended fully to move pawl 554 to the ratchet configuration).

Figure 12F:
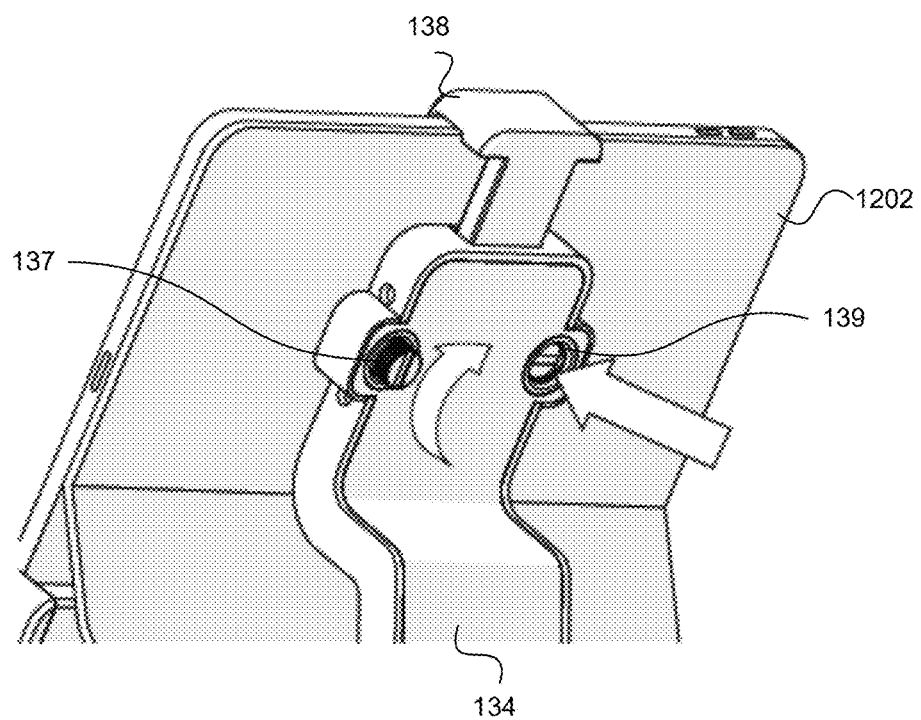

FIG. 12F shows configuration of ratcheting buttons 137, 139.

Ratcheting button 137, which is fully retracted, is rotated from second configuration, which is non-ratcheting to allow retraction (e.g., as shown in FIG. 11C) to a first configuration, which is ratcheting (e.g., as shown in FIG. 11A). With a ratcheting button in a ratcheting configuration, it may be extended (e.g., by pressing the back of the ratcheting button) as shown with respect to ratcheting button 139 to push tablet 1202 into engagement with braces (e.g., top brace 138) and reduce or eliminate any gap that might allow insertion of a tool such as a crowbar or screwdriver.

Figure 12G:
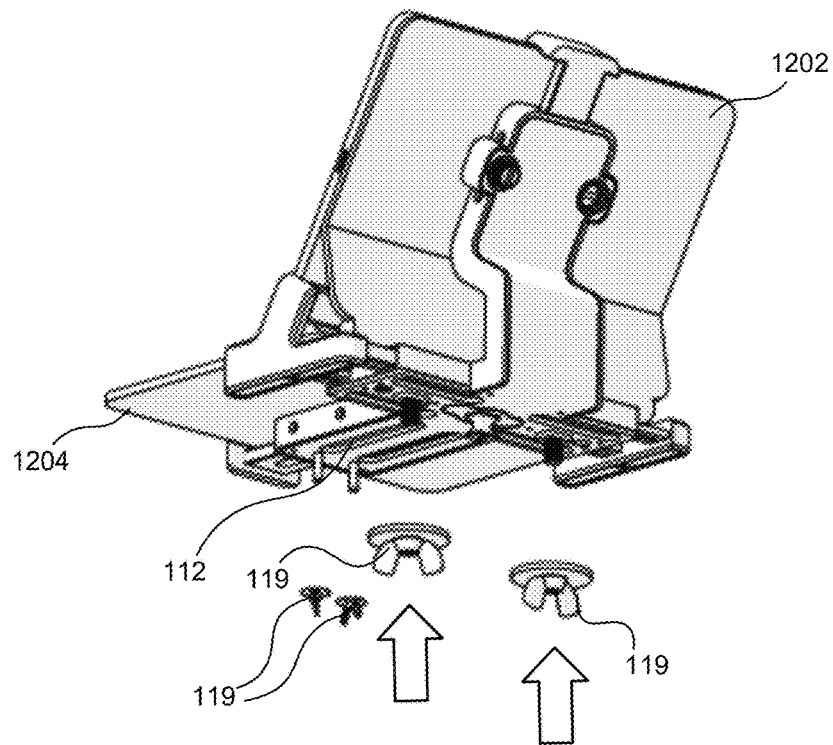

FIG. 12G shows mount 102 with tablet 1202 and keyboard 1204 secured to it being attached to a tabletop (omitted for clarity) using fasteners 119. In the example shown, threaded bolts extend down from main body 112 and wingnuts (with washers) are tightened to secure mount 102 to the tabletop (e.g., threaded bolts extend through the tabletop and wingnuts are attached from under the tabletop, with access to the underside of the tabletop being limited, for example, requiring a key to open cabinet doors or otherwise).

Figure 12H:
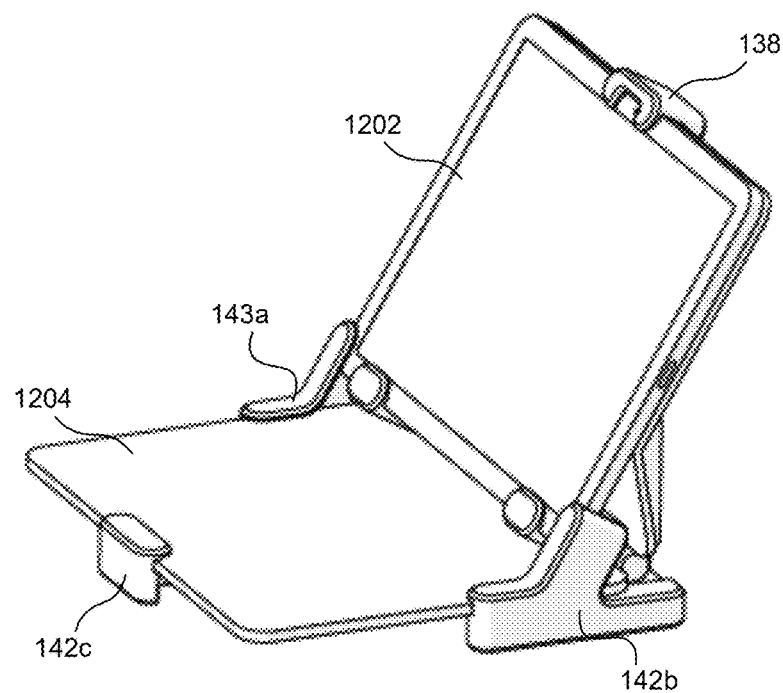

FIG. 12H shows tablet 1202 and keyboard 1204 secured with left, right, front and top braces 143*a*, 143*b*, 143*c* and 138 engaging corresponding edges to prevent removal of tablet 1202 or keyboard 1204. For example, with knob 162 located in a secured space below the tabletop, left and right arms 122*a*, 122*b* cannot be extended to disengage left and right braces 143*a*, 143*b*. With keyboard 1204 in place, front arm 144 cannot be extended and cannot be retracted further to reset its latching ratchet mechanism from the ratcheting configuration to the latched configuration to allow extension and disengagement of front brace 142*c*. Similarly, with tablet 1202 in place, top arm 136 cannot be extended and cannot be retracted further to reset its latching ratchet mechanism from the ratcheting configuration to the latched configuration to allow extension and disengagement of front brace 142*c*. Note that the order of FIGS. 12A-H is not necessarily the order used to secure a tablet and keyboard. For example, attachment of mount 102 to a tabletop may occur at any time, or mount 102 may remain attached to a tabletop throughout attachment of a tablet and keyboard (e.g., when replacing a tablet and/or keyboard while keeping the mount in the same location).

Figure 13:
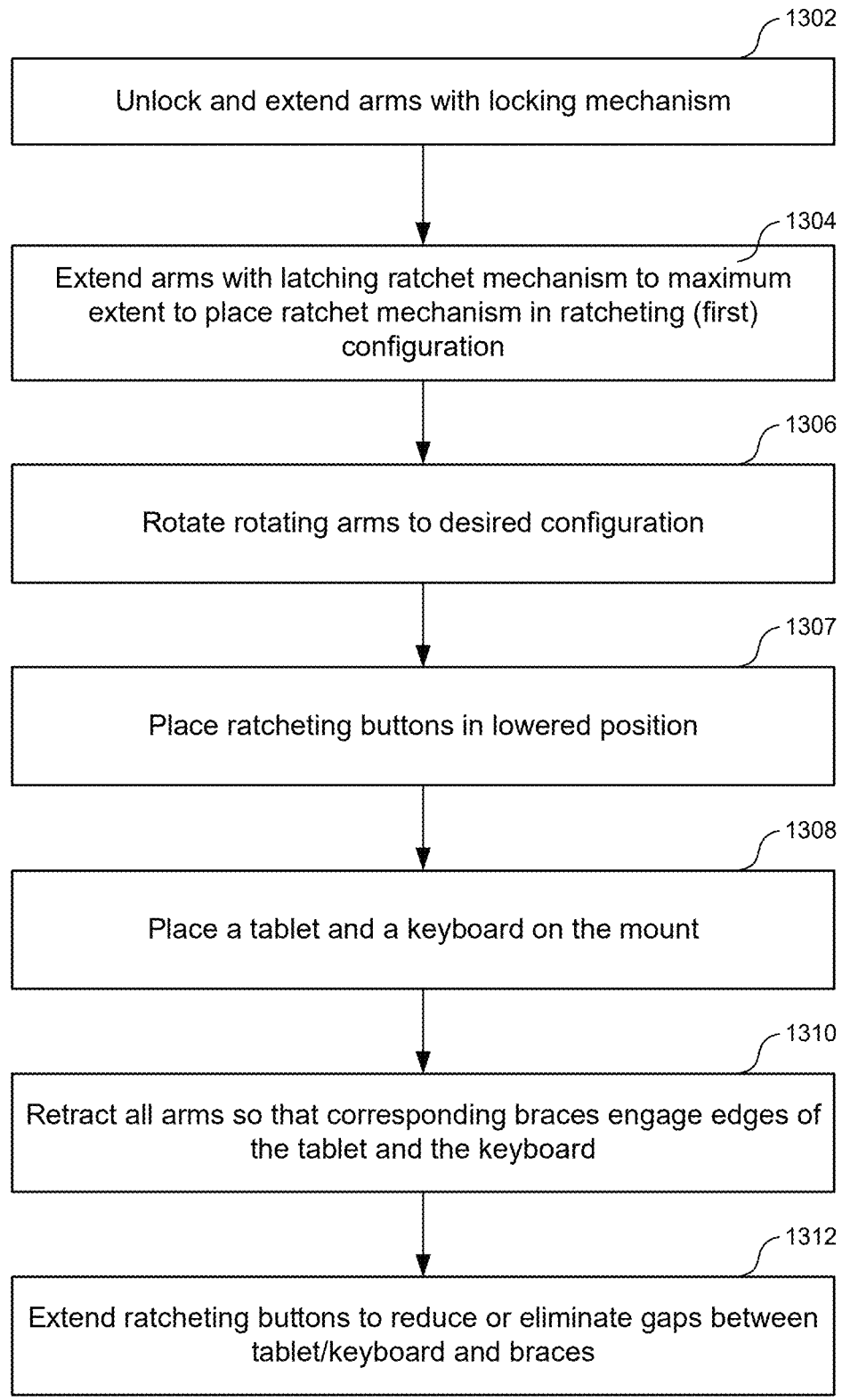
FIG. 13 illustrates an example of a method of securing a tablet and a keyboard to a mount.

An example method of securing item(s) in a mount is illustrated in FIG. 13. The method includes extending arms, rotating any rotating arms and lowering ratcheting buttons. Any arms having a locking mechanism (e.g., left and right arms 122*a*, 122*b*) may be unlocked and extended (e.g., using manual force or spring) sufficiently to allow insertion of the item(s) at step 1302 (maximum extension may not be necessary). For example, arms may be unlocked by manually pulling down on knob 162. (If any previous tablet and/or keyboard is present it may be removed at this point.) Any arms having a latching ratchet mechanism (e.g., top arm 136 and front arm 144) arms may be extended to their maximum extent to place the latching ratchet mechanism in the ratcheting (first) configuration at step 1304 (this may require fully retracting them first). Rotating arms (e.g., left rotating arm 143*a*) are rotated according to the desired configuration at step 1306 (e.g., rotated to engage a lower edge of an elevated tablet or rotated to clear a tablet that is to extend to the level of a keyboard). Ratcheting buttons (e.g., ratcheting buttons 137, 139) are placed in a lowered position at step 1307 (e.g., pushed through and reinserted or placed in non-ratcheting condition and pushed inward). A tablet and a keyboard are then placed on the mount at step 1308. All arms (e.g., left, right, top and front arms 122*a*, 122*b*, 136 and 144) are retracted so that corresponding braces engage edges of the tablet and the keyboard at step 1310. Ratcheting buttons are then extended to reduce or eliminate gaps between the tablet and/or keyboard and braces at step 1312 (with ratcheting buttons rotated to engage ratchet surfaces if necessary). Note that the order of the above steps may vary (e.g., prior to placing the tablet and keyboard on the mount 1308, steps 1302, 1304, 1306 and 1307 may be performed in any order).

Subsequently, if the tablet and keyboard are to be removed, arms with a locking mechanism (e.g., left and right arms 122*a*, 122*b*) may be unlocked (e.g., by manually pulling knob 162) and extended to allow removal.

A mount may be rapidly adapted to a range of different tablets and/or keyboards using the above steps, without tools, while providing a high degree of security when the tablets and/or keyboards are secured.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for physically securing a tablet and a keyboard to a tabletop of a display table or to another display surface, comprising:
    a main body;
    a left slot and a right slot on left and right sides respectively of the main body;
    a left arm and a right arm that extend respectively through the left slot and the right slot, the left and right arms are extendable and retractable relative to the main body to secure the tablet and the keyboard;
    a front arm extending from the main body to secure a front of the keyboard, the front arm is coupled to the main body by a first latching ratchet mechanism that prevents extension of the front arm in a first configuration of the first latching ratchet mechanism and enables extension of the front arm in a second configuration of the first latching ratchet mechanism;
    a back support extending from the main body; and
    a top arm extending from the back support, the top arm is coupled to the back support by a second latching ratchet mechanism that prevents extension of the top arm in a first configuration of the second latching ratchet mechanism and enables extension of the top arm in a second configuration of the second latching ratchet mechanism.

2. The apparatus of claim 1, wherein each of the first and second latching ratchet mechanisms include a linear rack with a first plurality of teeth and a pawl with a second plurality of teeth to engage the first plurality of teeth in the first configuration of the first or second latching ratchet mechanism.

3. The apparatus of claim 2, wherein each of the first and second latching ratchet mechanisms further include a spring to bias the pawl in the first configuration of the first or second latching ratchet mechanism and a ball plunger to capture the pawl away from the linear rack in the second configuration of the first or second latching ratchet mechanism.

4. The apparatus of claim 3, wherein the pawl includes a pawl pin configured to engage a first cam surface to rotate the pawl away from the linear rack into engagement with the ball plunger and to engage a second cam surface to rotate the pawl out of engagement with the ball plunger towards the linear rack.

5. The apparatus of claim 4, wherein the first cam surface is at an inner limit of a slot in an arm guide and the second cam surface is at an outer limit of the slot.

6. The apparatus of claim 1, further comprising:
    a left brace of the left arm, the left brace configured to engage a left edge of each of the tablet and the keyboard; and
    a right brace of the right arm, the right brace configured to engage a right edge of each of the tablet and the keyboard.

7. The apparatus of claim 6, wherein:
    the left brace includes a left rotating arm that is rotatable between a first position to engage a lower edge of the tablet and a second position that is clear of the lower edge of the tablet; and
    the right brace includes a right rotating arm that is rotatable between the first position to engage a lower edge of the tablet and the second position that is clear of the lower edge of the tablet.

8. The apparatus of claim 7, wherein the left and right rotating arms are rotatable through at least 90 degrees.

9. The apparatus of claim 1, wherein:
    the left arm includes a left linear rack that engages circumferential teeth of a circular gear;
    the right arm includes a right linear rack that engages the circumferential teeth of the circular gear such that retraction and extension of the left and right arms occurs in tandem; and
    the circular gear includes radial teeth that extend radially from an axis of rotation of the circular gear to engage corresponding radial teeth of a locking element.

10. The apparatus of claim 9, further comprising:
    one or more spring to maintain the locking element engaged with the radial teeth of the circular gear; and
    a knob to enable manual movement of the locking element away from the circular gear to unlock the circular gear and thereby enable extension of the left and right arms.

11. The apparatus of claim 1, further comprising one or more ratcheting buttons, each ratcheting button located in a corresponding hole in the back support, each ratcheting button configured to be movable within the corresponding hole toward the tablet with a ratchet mechanism to prevent movement of the ratcheting button away from the tablet within the corresponding hole.

12. An apparatus for physically securing a tablet and a keyboard to a tabletop of a display table or to another display surface, the apparatus comprising:
- a main body having a top surface;
- a back support extending from the top surface, the back support including a back support surface that extends along a plane that forms an obtuse angle with the top surface to support the tablet;
- a top arm extending from the back support to secure a top edge of the tablet;
- a front arm extending from the main body to secure a front of the keyboard;
- a left arm and a right arm each of which is extendable and retractable relative to the main body;
- a left brace and a right brace, attached to the left and right arms respectively, and configured to engage left edges and right edges, respectively, of the keyboard and the tablet;
- a first latching ratchet mechanism that prevents extension of the top arm in a first configuration of the first latching ratchet mechanism and enables extension of the top arm in a second configuration of the first latching ratchet mechanism;
- a second latching ratchet mechanism that prevents extension of the front arm in a first configuration of the second latching ratchet mechanism and enables extension of the front arm in the second configuration of the second latching ratchet mechanism;
- a locking mechanism configured to lock the left and right arms in place; and
- one or more fasteners that extend downward from a bottom surface of the main body.

13. The apparatus of claim 12, wherein the locking mechanism is inaccessible with the tablet lying along the back support surface.

14. The apparatus of claim 12, wherein each of the first and second latching ratchet mechanisms include a linear rack with a first plurality of teeth and a pawl with a second plurality of teeth to engage the first plurality of teeth in the first configuration of the first or second latching ratchet mechanism.

15. The apparatus of claim 14, wherein the first and second latching ratchet mechanisms are only releasable by retracting respectively the top arm and the front arm to their respective limits of travel.

16. The apparatus of claim 12, wherein the left brace and the right brace include rotatable arms, the rotatable arms are rotatable to engage a lower edge of the tablet at a predetermined height above the top surface in a first configuration and to disengage from the lower edge of the tablet in a second configuration.

17. The apparatus of claim 12, further comprising a plurality of fasteners that extend downward from a bottom surface of the main body and are attachable to a tabletop of a display table or to another display surface to thereby secure the main body to the tabletop or other display surface.

18. The apparatus of claim 17, wherein the locking mechanism further includes a lock release that extends downward from the bottom surface of the main body to extend below the display table or other display surface when the main body is secured to the tabletop or other display surface.

19. An apparatus for physically securing a tablet and a keyboard to a tabletop of a display table or to another display surface, the apparatus comprising:
- a main body;
- a back support extending from the main body, the back support including a back support surface to support the tablet;
- a top arm extending from the back support to secure a top edge of the tablet;
- a first latching ratchet mechanism that prevents extension of the top arm in a first configuration of the first latching ratchet mechanism and enables extension of the top arm in a second configuration of the first latching ratchet mechanism;
- a front arm extending from the main body to secure a front of the keyboard;
- a second latching ratchet mechanism that prevents extension of the front arm in the first configuration of the second latching ratchet mechanism and enables extension of the front arm in the second configuration; of the second latching ratchet mechanism;
- a left arm and a right arm which are extendable and retractable in tandem relative to the main body;
- a locking mechanism configured to lock the left and right arms in place, the locking mechanism includes a lock release that is only accessible from below the tabletop or other display surface;
- a left brace attached to the left arm, the left brace configured to engage left sides of the keyboard and the tablet, the left brace includes a left rotating arm that is rotatable between a first position to engage a lower edge of the tablet and a second position that is clear of the lower edge of the tablet;
- a right brace attached to the right arm, the right brace configured to engage right sides of the keyboard and the tablet, the right brace includes a right rotating arm that is rotatable between the first position to engage the lower edge of the tablet and the second position that is clear of the lower edge of the tablet; and
- one or more fasteners that extend downward from a bottom surface of the main body and are attachable to the tabletop or other display surface to thereby secure the main body to the tabletop or other display surface.

20. The apparatus of claim 19, wherein each of the first and second latching ratchet mechanisms include:
- a linear rack with a first plurality of teeth and a pawl with a second plurality of teeth to engage the first plurality of teeth in the first configuration of the first or second latching ratchet mechanism;
- a spring to bias the pawl in the first configuration of the first or second latching ratchet mechanism and a ball plunger to capture the pawl away from the linear rack in the second configuration of the first or second latching ratchet mechanism; and
- a pawl pin extending from the pawl, the pawl pin configured to engage a first cam surface to rotate the pawl away from the linear rack into engagement with the ball plunger and to engage a second cam surface to rotate the pawl out of engagement with the ball plunger towards the linear rack.

* * * * *

UNITED STATES PATENT AND TRADEMARK OFFICE
CERTIFICATE OF CORRECTION

PATENT NO. : 12,276,373 B1
APPLICATION NO. : 18/530040
DATED : April 15, 2025
INVENTOR(S) : Naderzad et al.

It is certified that error appears in the above-identified patent and that said Letters Patent is hereby corrected as shown below:

In the Claims

Column 22, Line 57 (Claim 10, Line 2), please change "spring" to -- springs --.

Signed and Sealed this
Seventeenth Day of June, 2025

Coke Morgan Stewart
*Acting Director of the United States Patent and Trademark Office*